US012742516B2

(12) United States Patent
Zeni et al.

(10) Patent No.: US 12,742,516 B2
(45) Date of Patent: Sep. 22, 2026

(54) COMPRESSED GAS STORAGE TANK, SYSTEM AND METHOD

(71) Applicant: ARDENT UNDERGROUND PTY LTD, Regents Park (AU)

(72) Inventors: John Zeni, Littleton (AU); Keith Lovegrove, Narrabundah (AU); David Bentley, Maroubra (AU)

(73) Assignee: Ardent Underground Pty Ltd, New South Wales (AU)

( * ) Notice: Subject to any disclaimer, the term of this patent is extended or adjusted under 35 U.S.C. 154(b) by 0 days.

(21) Appl. No.: 18/881,401

(22) PCT Filed: Apr. 19, 2023

(86) PCT No.: PCT/AU2023/050318

§ 371 (c)(1),
(2) Date: Jan. 6, 2025

(87) PCT Pub. No.: WO2024/007048

PCT Pub. Date: Jan. 11, 2024

(65) Prior Publication Data

US 2025/0377074 A1 Dec. 11, 2025

(30) Foreign Application Priority Data

Jul. 6, 2022 (AU) ................................ 2022901899

(51) Int. Cl.
*F17C 1/00* (2006.01)

(52) U.S. Cl.
CPC ...... *F17C 1/007* (2013.01); *F17C 2201/0185* (2013.01); *F17C 2201/032* (2013.01);
(Continued)

(58) Field of Classification Search
CPC .............. F17C 1/007; F17C 2203/0682; F17C 2203/0685; F17C 2205/0196;
(Continued)

(56) References Cited

U.S. PATENT DOCUMENTS 3,301,320 A * 1/1967 Huntington ............... F17C 1/12
165/154
3,352,116 A * 11/1967 Waterman .............. B65D 88/76
52/249

(Continued)

FOREIGN PATENT DOCUMENTS

EP 2602454 A1 6/2013
EP 2832666 A1 2/2015

OTHER PUBLICATIONS

International Preliminary Report on Patentability Received for PCT Patent Application No. PCT/AU2023/050318, Mailed on Oct. 5, 2023, 5 Pages.

(Continued)

*Primary Examiner* — Nathan J Jenness
*Assistant Examiner* — Jennifer Castriotta
(74) *Attorney, Agent, or Firm* — Metz Lewis Brodman Must O'Keefe

(57) ABSTRACT

A storage tank 10 comprises a first chamber 14 configured to store a first gas 18 under pressure. The first chamber 14 is defined by a first wall 20 and is arranged within a surrounding structure 12. The storage tank also comprises a flexible membrane 22 provided between the first wall 20 and the surrounding structure 12. A second chamber 16 is formed between the first wall 20 and the flexible membrane 22. The second chamber 16 has a variable volume. The variable volume of the second chamber 16 compensates for any movement in the surrounding structure 12 and maintains the volume of the first chamber 14 substantially unchanged regardless of the pressure of the first gas 18. The storage tank
(Continued)

also comprises at least one transfer pipe 50 which supplies the first gas 18 into the first chamber 14.

22 Claims, 12 Drawing Sheets

(52) U.S. Cl.
CPC *F17C 2203/012* (2013.01); *F17C 2203/0604* (2013.01); *F17C 2203/0639* (2013.01); *F17C 2203/0678* (2013.01); *F17C 2203/0685* (2013.01); *F17C 2205/0196* (2013.01); *F17C 2221/012* (2013.01); *F17C 2270/0142* (2013.01)

(58) Field of Classification Search
CPC ........ F17C 2201/0185; F17C 2201/032; F17C 2203/0639; F17C 2203/0678; F17C 2203/0695; F17C 2270/0142
See application file for complete search history.

(56) References Cited

U.S. PATENT DOCUMENTS

| | | | | |
|---|---|---|---|---|
| 5,207,530 | A | 5/1993 | Brooks et al. | |
| 6,119,465 | A * | 9/2000 | Mullens | A01N 1/145 62/45.1 |
| 6,368,018 | B2 | 4/2002 | Johansson | |
| 9,470,367 | B2 * | 10/2016 | Hyde | F17C 3/00 |
| 9,920,970 | B2 * | 3/2018 | Arnitz | F25D 3/105 |
| 11,346,499 | B1 * | 5/2022 | Joubert Des Ouches | F17C 1/06 |
| 11,435,034 | B1 * | 9/2022 | Drube | F17C 3/06 |
| 2003/0168463 | A1 | 9/2003 | Yoshihara et al. | |
| 2011/0079140 | A1 | 4/2011 | Baseley | |
| 2014/0013735 | A1 | 1/2014 | Mcbride et al. | |

OTHER PUBLICATIONS

International Search Report and Written Opinion received for PCT Patent Application No. PCT/AU2023/050318, mailed on Jun. 29, 2023, 10 pages.

* cited by examiner

COMPRESSED GAS STORAGE TANK, SYSTEM AND METHOD

TECHNICAL FIELD

The present disclosure relates to a storage tank for storing gas, a system which includes the storage tank, and a method for storing gas. In more detail, the disclosure relates to the storage of compressed gas or gas under pressure.

BACKGROUND

A consideration for the storage of hydrogen gas, regardless of its end use, is hydrogen's low volumetric energy density compared to hydrocarbon fuels. Storing hydrogen gas in sufficient quantities for large scale use requires a comparatively large volume and/or the capacity to hold the hydrogen gas at considerably high pressure. Safely storing any fluid at high pressure involves resisting significant forces acting in all directions within the storage container. Hydrogen storage is further complicated by the element's weakening effects on materials (for example, steel) under stress and its propensity to permeate other materials.

Steel under stress is particularly vulnerable to hydrogen attack. In concert with stress due to high pressure, atomic hydrogen interacts with metallurgical defects to activate embrittlement, resulting in reduced ductility and reduced fracture resistance.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Disclosed herein is a storage tank comprising: a first chamber configured to store a first gas under pressure, the first chamber being defined by a first wall and being arranged within a surrounding structure; a flexible membrane provided between the first wall and the surrounding structure; a second chamber between the first wall and the flexible membrane, wherein the second chamber has a variable volume; and at least one transfer pipe which supplies the first gas into the first chamber.

The surrounding structure may be relied upon to restrain a portion of the force exerted by the gas under pressure. The second chamber has a variable volume. Variable volume in this instance is intended to mean that the physical volume or capacity of the second chamber (as measured, for example, in cubic meters) is variable. This variation in the physical volume or capacity may be an expansion or a contraction in the physical volume or capacity.

The second chamber may be configured to hold a fluid which is different to the first gas. The second chamber may be configured to hold a fluid having the same composition as the first gas.

A pressure of the fluid in the second chamber may be regulated to correspond to a pressure of the first gas in the first chamber. A regulator may be associated with the gas storage tank. A pressure of the fluid in the second chamber may be regulated by the regulator to correspond to a pressure of the first gas in the first chamber such that forces acting on the first wall by the first gas in the first chamber are opposed by forces acting on the first wall by the fluid in the second chamber. The pressure in the second chamber may correspond to the pressure in the first chamber. Stresses on the first wall due to the pressure in the first chamber may be reduced due to the forces acting on the first wall due to the pressure in the second chamber.

The first wall may comprise one or more of a steel, a steel alloy, a non-ferrous alloy, copper, aluminium, or the like. The first wall may comprise reinforced concrete. The first wall may comprise a liner material of steel, steel alloy, a non-ferrous alloy, copper, aluminium, or the like, or combinations thereof. The first wall may comprise the liner material and the reinforced concrete. The first wall may comprise a composite of steel and concrete. The internal face of the first wall may be in direct contact with the first gas in the first chamber.

Where the first wall comprises a composite of steel and concrete, the first wall may comprise an internal steel liner and an external steel shell. A reinforced concrete layer may be provided between the internal steel liner and the external steel shell. The internal steel liner may be in direct contact with the first gas in the first chamber. The external steel shell may be in direct contact with the fluid in the second chamber.

When the second chamber is pressurised above a threshold value, the volume of the second chamber may increase and decrease to compensate for movement in the surrounding structure. For example, the volume of the second chamber may increase and decrease to compensate for an expansion or contraction of the structure within which the storage tank is arranged.

The second chamber may comprise a plurality of smaller chambers.

Each smaller chamber may include an isolation mechanism which isolates the smaller chamber from other smaller chambers.

The flexible membrane may be in the form of a tube having an internal diameter sufficiently large to surround the first wall.

The gas storage tank may comprise a further flexible membrane separated from the flexible membrane by a third chamber.

The first gas may be drawable from the first chamber via the at least one transfer pipe. Thus, the first gas may be supplied to and withdrawn from the first chamber via the same transfer pipe.

The gas storage tank may have at least one pipe (a fluid pipe) in fluid communication with the second chamber. The fluid may be supplied to the second chamber via the at least one pipe and the fluid may return from the second chamber via the at least one pipe. In other words, the fluid may be supplied to and returned from the second chamber by the same pipe (the same fluid pipe).

Alternatively, the gas storage tank may comprise at least one first pipe (a first fluid pipe) in fluid communication with the second chamber and at least one second pipe (a second fluid pipe) in fluid communication with the second chamber. The fluid may be supplied to the second chamber via the at least one first pipe or the at least one second pipe and the fluid may return from the second chamber via the other of the at least one first pipe and the at least one second pipe.

The at least one first pipe and the at least one second pipe may be provided or arranged at least partially within the first wall. For example, the at least one fluid pipe and/or the at least one second pipe may be embedded within the first wall such that they extend for part of their length in a direction parallel to at least one of the surfaces of the first wall.

The first pipe may be connected to the second chamber at a position vertically lower than a position at which the at least one second pipe is connected to the second chamber.

The fluid may be supplied to the second chamber via the at least one first pipe and may return from the second chamber via the at least one second pipe.

The gas storage tank may include a first extension and the flexible membrane may be sealed closed in the vicinity of the first extension. In addition, the gas storage tank may include a second extension and the flexible membrane may be sealed closed in the vicinity of the second extension. The first extension may be provided at a first end of the storage tank and the second extension may be provided at a second end of the storage tank, wherein the second end is opposite the first end.

The flexible membrane may be sealed to the first extension by a clamping device. The flexible membrane may be sealed to the second extension by a clamping device. The flexible membrane may be in the form of an inflatable packer.

The gas storage tank may include at least one bracket configured to position the storage tank within the surrounding structure. The at least one bracket may include a plurality of arms which extend laterally outward beyond the diameter of the second chamber and may be configured to centre the storage tank within a cavity or shaft created in the surrounding structure. One bracket may be provided on the first extension or one bracket may be provided on the second extension. Alternatively, one bracket may be provided on the first extension and one bracket may be provided on the second extension.

The at least one gas pipe and the at least one fluid pipe may extend through the first extension.

The at least one gas pipe, the at least one first pipe, and the at least one second pipe may extend through the first extension. For example, the at least one gas pipe may extend through the extension to a delivery system which delivers the first gas to and withdraws the first gas from the first chamber. The at least one first pipe and the at least one second pipe may extend through the extension to a delivery system which delivers the fluid to and withdraws the fluid from the second chamber.

The first gas may be selected from the group consisting of hydrogen, nitrogen, carbon dioxide, natural gas, hydrocarbon gases and oxygen. The first gas may comprise a mixture of gases.

The fluid may be any one of water, nitrogen, air, carbon dioxide, hydraulic oil, and glycol.

The flexible membrane may be made from any one of rubber, reinforced rubber, a plastics material, a reinforced plastics material, urethane, a reinforced urethane material, steel, non-ferrous metals, and alloys.

The storage tank may have a longitudinal axis and the storage tank may be arranged such that the longitudinal axis extends substantially vertically. Alternatively, the storage tank may be arranged such that the longitudinal axis extends substantially horizontally. The storage tank may be arranged so that the longitudinal axis extends at an angle with respect to the vertical or horizontal planes.

Also disclosed herein is a gas storage system comprising: a gas storage tank such as described above; a first delivery system configured to supply the first gas to the first chamber; and a second delivery system configured to supply the fluid to the second chamber.

The system may include a regulator which regulates a pressure of the fluid in the second chamber to correspond to a pressure of the first gas in the first chamber.

The system may include a regulator which regulates a pressure of the fluid in the second chamber to correspond to a pressure of the first gas in the first chamber such that forces acting on the first wall by the first gas in the first chamber are opposed by forces acting on the first wall by the fluid in the second chamber. The pressure in the second chamber may be regulated to be the same as the pressure in the first chamber or substantially the same as the pressure in the first chamber. Stresses on the first wall due to the pressure in the first chamber may be reduced due to the forces acting on the first wall due to the pressure in the second chamber.

The system may further comprise a first circulation system to circulate the fluid within the second chamber in order to regulate a temperature of the second chamber. The first circulation system may include drawing the fluid from the second chamber and returning the fluid to the second chamber.

Regulation of the temperature of the second chamber may also regulate a temperature of the first wall. Regulation of the temperature of the second chamber may also regulate a temperature of the first gas in the first chamber. This may occur through exchange of heat from the first gas in the first chamber through the first wall to the fluid in the second chamber or the exchange of heat from the fluid in the second chamber through the first wall to the first gas in the first chamber. Where the first pipes and/or the second pipes are within the first wall, the heat exchange may be between the fluid in the first pipes and the second pipes and the first gas in the first chamber.

The first circulation system may include one or more heat exchangers in order to heat or cool the fluid.

The first circulation system may include at least one reservoir configured to store a medium for heat exchange with the fluid. The reservoir may be insulated.

When the storage tank comprises at least one first pipe in communication with the second chamber and at least one second pipe in communication with the second chamber and the fluid is supplied to the second chamber via the at least one first pipe or the at least one second pipe and the fluid returns from the second chamber via the other of the at least one first pipe and the at least one second pipe, and the second delivery system may be connected to the at least one first pipe and the at least one second pipe.

The system may comprise a second circulation system having an independent network of pipes embedded within the first wall. A fluid may be circulated through the second circulation system in order to regulate the temperature of the first wall and thereby regulate temperatures within the first chamber and the second chamber through heat exchange. The second circulation system may include one or more heat exchangers in order to heat or cool the fluid being circulated in the second circulation system. In addition, the second circulation system may include at least one reservoir configured to store a medium for heat exchange with the fluid of the second circulation system. The fluid circulated in the second circulation system may be, for example, water or glycol fluid.

The gas storage system may include sensors or analysers for detecting a presence of the first gas within the fluid.

This disclosure relates to the storage of gases under pressure (for example, the storage of high pressure hydrogen). Embodiments of the gas storage tank and the gas storage system described herein relate to mechanisms and strategies for reducing stresses which the first wall of the first chamber within which the gas is stored may experience due to the presence of the gas under pressure within that first chamber. It is possible to adjust the pressure in the second chamber (which is to the outside of the first wall) so that it matches or corresponds to the pressure in the first chamber. It will be appreciated from the following that the storage tank described herein may go through many cycles of filling and emptying. Reducing stress on the first wall of the first chamber may increase the life of the first wall. Furthermore, decreasing the stress may also decrease damage to the first wall due to the action of the first gas stored within the chamber on the first wall. For example, as mentioned above, steel under stress is particularly vulnerable to hydrogen attack.

As explained in more detail below, as the second chamber has a variable volume due to the presence of the flexible membrane, the second chamber is also able to compensate for movements which might occur in the structure which surrounds the storage tank and in doing so may reduce the effects of those movements on the first wall of the first chamber within which the gas is or will be stored.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

FIGS. 1A to 11 are schematic and the components shown in these Figures are not to scale.

DESCRIPTION OF EMBODIMENTS

Figure 2:
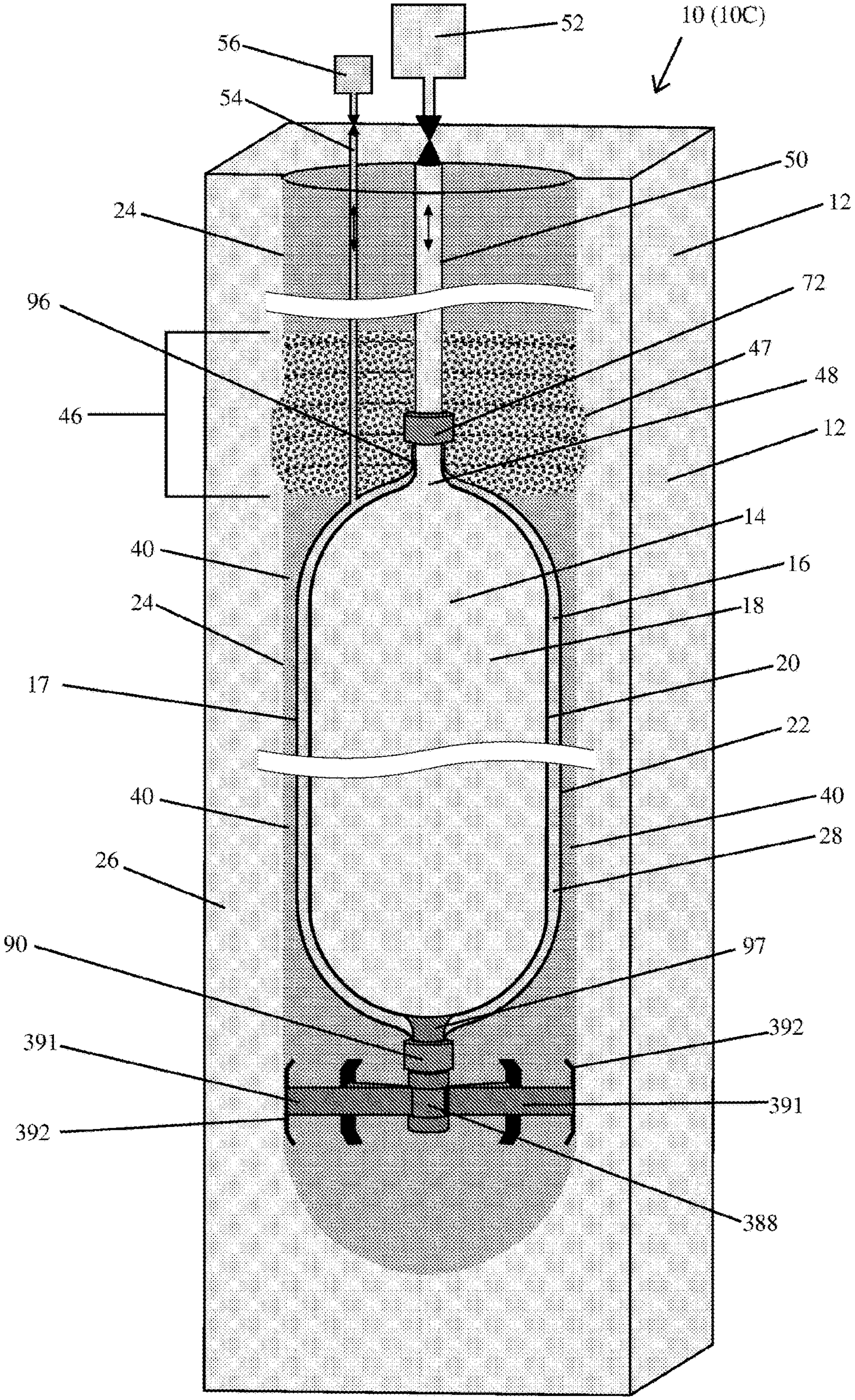
FIG. 2 is a schematic diagram of a storage tank according to another embodiment of the present disclosure.
Figure 3:
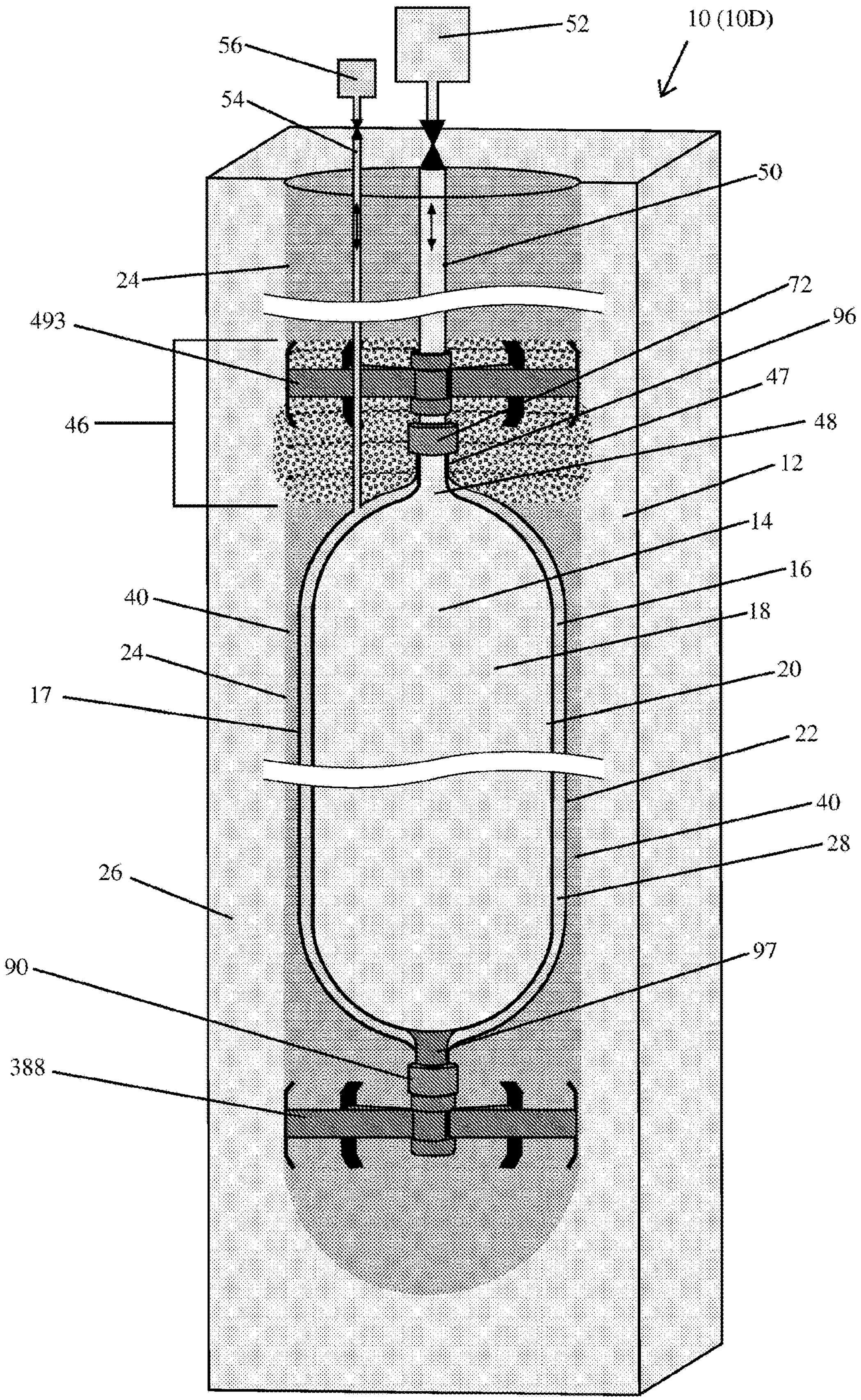
FIG. 3 is a schematic diagram of a storage tank according to yet another embodiment of the present disclosure.
Figure 4:
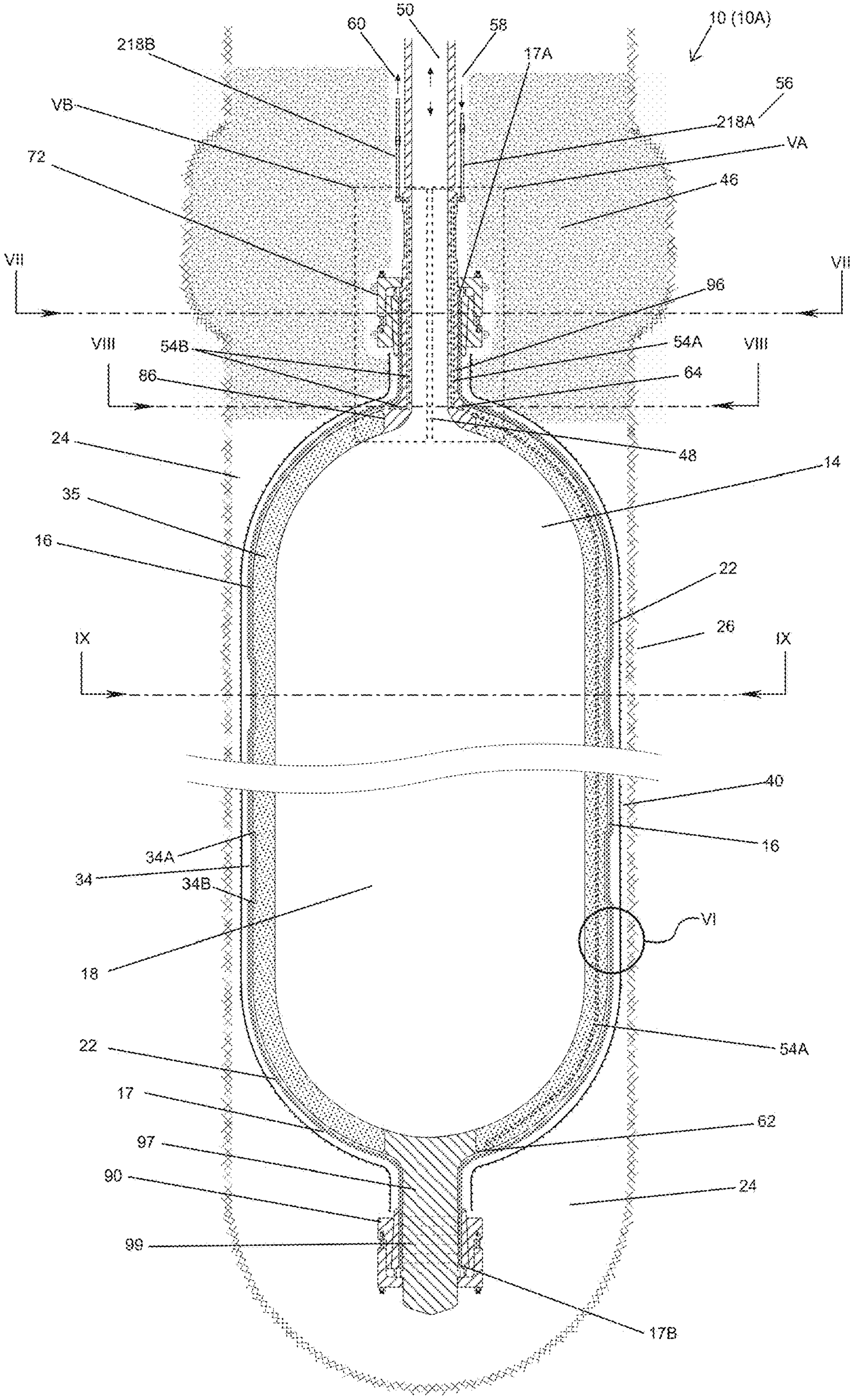
FIG. 4 is a view showing a schematic cross-section of a storage tank according to another embodiment of the present disclosure.

With reference to FIGS. 1A to 9, reference number 10 generally designates a storage tank for storing a gas according to an embodiment of the present disclosure. The storage tank 10 is located within a surrounding structure 12. As can be seen, for examples, in FIGS. 1A and 4, the storage tank 10 includes a first chamber 14 and a second chamber 16. The first chamber 14 is configured to store a first gas 18 under pressure. The first chamber 14 is defined by a first wall 20. As can be seen in FIG. 4, the first wall 20 surrounds the first chamber 14. The storage tank 10 includes a flexible membrane 22 provided between the first wall 20 and the surrounding structure 12. The second chamber 16 is formed between the first wall 20 and the flexible membrane 22. As will be explained in more detail below, the second chamber 16 has a variable volume. In contrast to the second chamber 16, the first chamber 14 has a substantially fixed volume.

FIGS. 1A to 4 show different embodiments of a storage tank 10 (that is, 10A, 10B, 10C, and 10D). In the following, the storage tank 10 is described primarily with regard to the embodiment shown in FIGS. 4 to 9. However, embodiments shown in FIGS. 1A to 3 are also referenced. While there may be some differences in the embodiments as discussed below, except where otherwise indicated, components of the various embodiments which are similar or the same are referenced with the same reference numbers. In some instances, as indicated, the same reference numbers may be used for the same or similar components but are preceded by a "3" (See FIGS. 1A, 1B, 2 and 3) or a "4" (see FIG. 3).

The surrounding structure 12 may be a natural structure, or an artificial structure, or a combination of both a natural structure and an artificial structure. In the embodiments shown in FIGS. 1A to 4, the storage tank 10 is provided in a cavity 24 cut into a natural rock formation (natural rock structure) 26. In these embodiments, the cavity 24 is a blind bored shaft formed by drilling.

The first gas 18 corresponds to the gas which is stored in the storage tank 10. The type of first gas 18 stored in the storage tank 10 is not particularly limited. Thus, non-limiting examples of the first gas 18 include hydrogen, nitrogen, carbon dioxide, oxygen, hydrocarbon gases, natural gas, and air. While the first gas 18 is not particularly limited, this disclosure uses hydrogen as an example. There are some advantages for the storage of hydrogen under pressure with the storage tank 10. In this disclosure, the first gas 18 is described as a gas. However, it is possible that depending on conditions within the storage tank or within the system described below, the first gas 18 may be a fluid and it may be in the form of a liquid. The first gas 18 may be a mixture of gases.

The second chamber 16 is configured to hold a fluid 28. The fluid 28 may be different to the first gas 18. The fluid 28 may also be a gas (a second gas). The type of the fluid 28 in the second chamber 16 is not particularly limited. Thus, non-limiting examples of the fluid 28 include water, nitrogen, air, carbon dioxide, hydraulic oil, glycol, and the like. As will be appreciated from the present disclosure, the fluid 28 may be selected in light of the nature of the first gas 18 stored in the first chamber 14. For example, where the first gas 18 is hydrogen, a fluid 28 which is not reactive with hydrogen may be selected. It is also possible for the first gas 18 and the fluid 28 to be the same (that is, have the same composition). For example, the first gas 18 may be nitrogen and the fluid 28 may be nitrogen. In addition, in another example, the first gas 18 may be carbon dioxide and the fluid 28 may be carbon dioxide. It will be appreciated from the present disclosure that even when the first gas 18 and the fluid 28 have the same composition (i.e., are the same), depending on the conditions within the first chamber 14 and the second chamber 16, the first gas 18 and the fluid 28 may differ in their state, pressure, temperature, or the like.

Figure 5A:
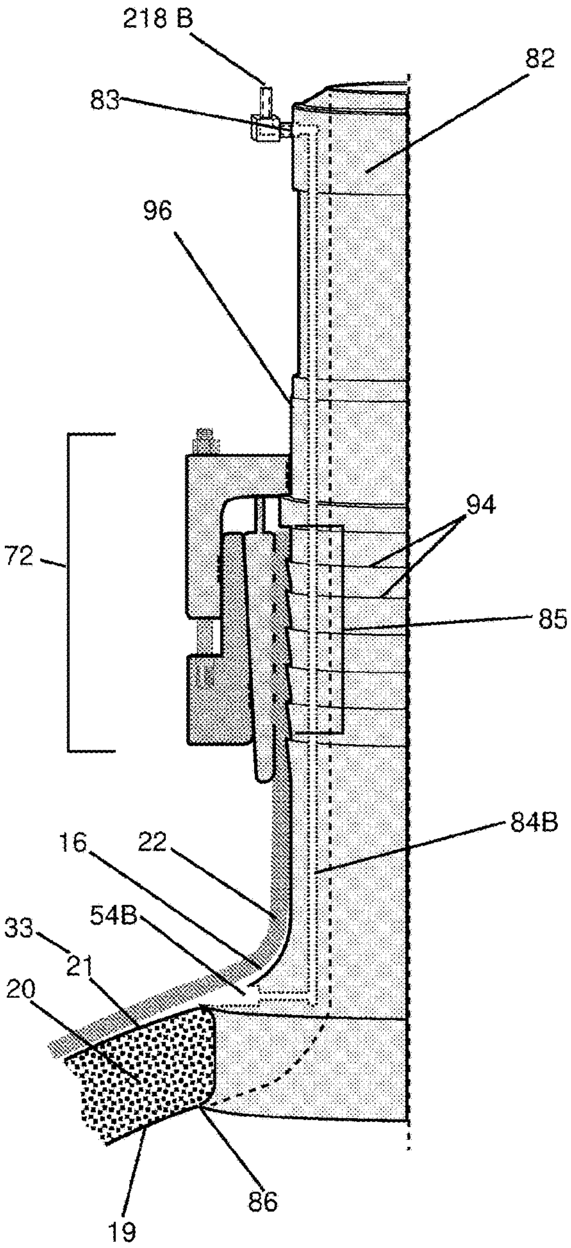
FIGS. 5A and 5B are enlarged views of part of an embodiment of the present disclosure corresponding to the sections indicated in boxes VA and VB in FIG. 4, respectively.
Figure 5B:
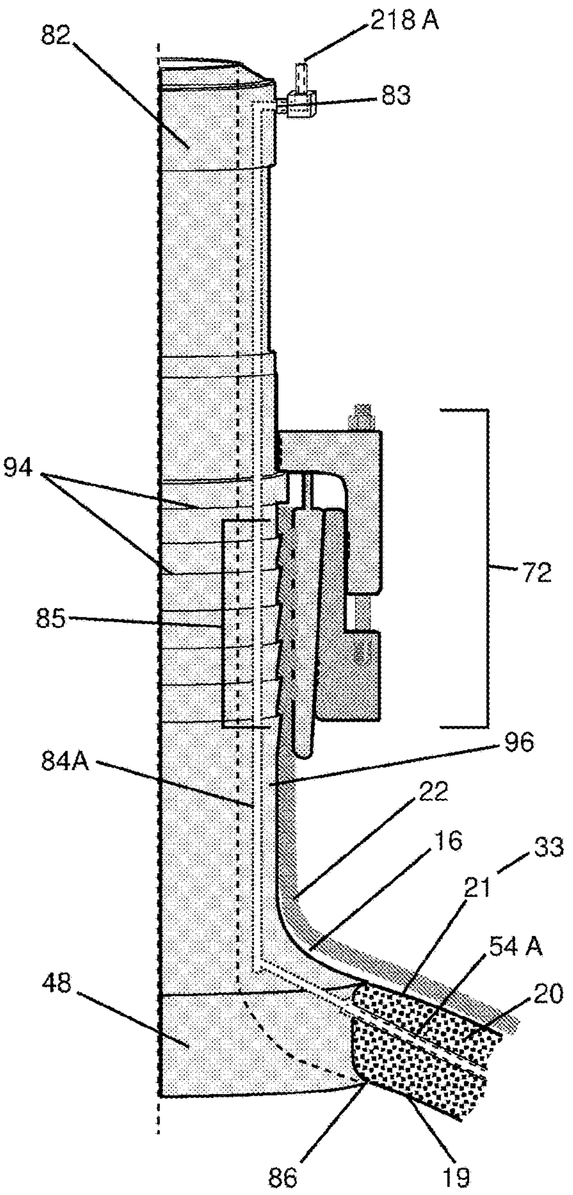
Figure 6:
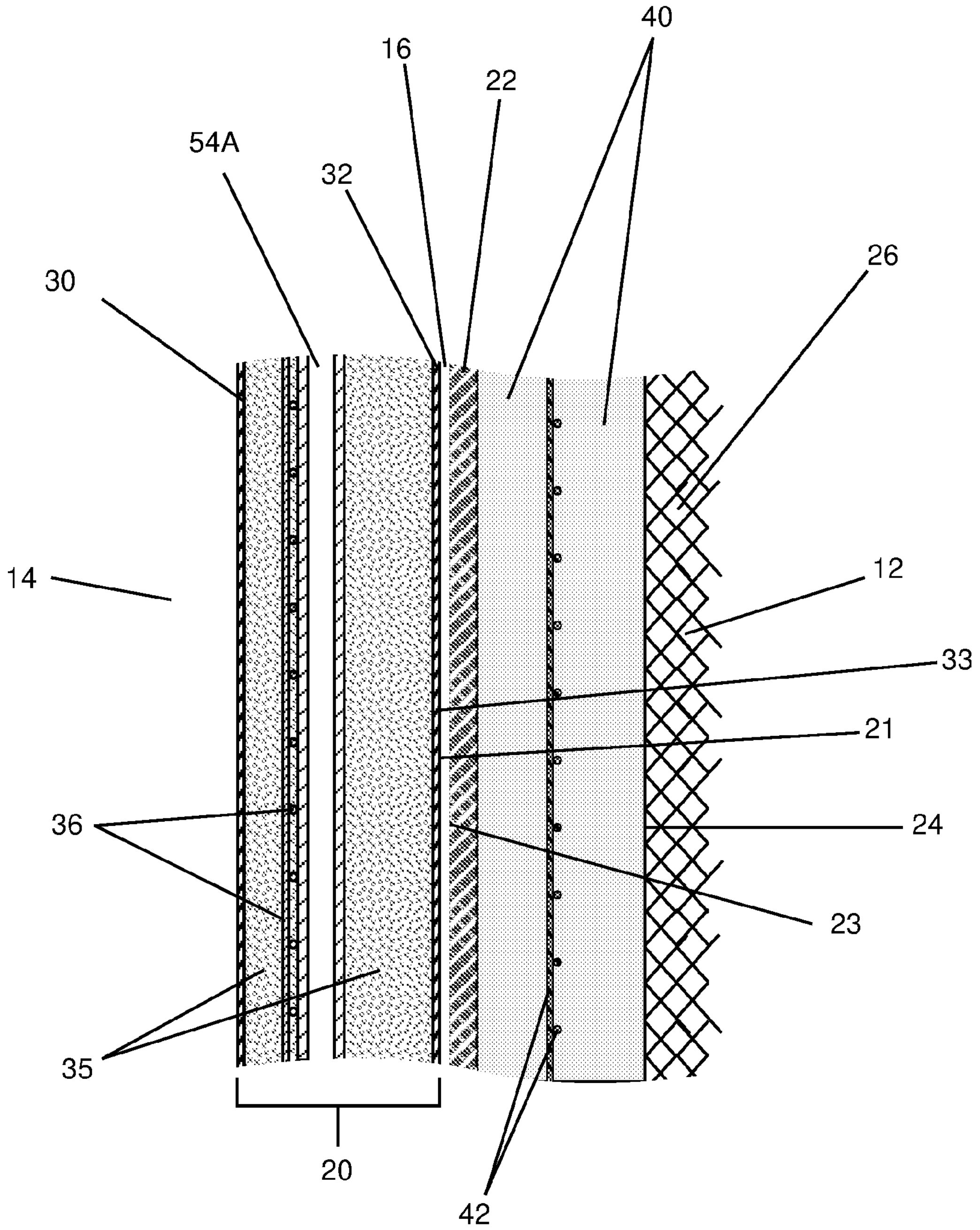
FIG. 6 shows an enlarged view of the section within the circle VI in FIG. 4.

The first chamber 14 is configured to store the first gas 18 under pressure or at a higher pressure than atmospheric pressure at the location or altitude of the storage tank 10. The first gas 18 under such pressure will form a compressed gas. Therefore, the first wall 20 is configured to be impermeable or substantially impermeable to the first gas 18. The first wall 20 may include reinforced concrete or similar material. The reinforced concrete may be permeable to or reactive with the first gas 18 which is to be stored in the first chamber 14 and/or the fluid 28 to be used in the second chamber 16. In that case, on the side toward the first chamber 14 (the inner side of the reinforced concrete), the reinforced concrete is lined with a material which is impermeable or substantially impermeable to the first gas 18 which is to be stored in the first chamber 14. In addition, in a similar way, on the side toward the second chamber 16 (the outer side of the reinforced concrete), the reinforced concrete is lined with a material which is impermeable or substantially impermeable to the fluid 28 which is to be used in the second chamber 16. The material used to line each side of the reinforced concrete may be the same or it may be different depending on the first gas 18 and the fluid 28. In addition, the lining material may be arranged directly against the reinforced concrete or another material may be provided between the lining material and the reinforced concrete. In addition, the lining material on the inner side of the reinforced concrete may form an internal surface of the first chamber 14 or another material may be arranged on that lining material. In the same way, the lining material on the outer surface of the reinforced concrete may form an internal surface of the second chamber or another material may be arranged on that lining material (see for example the discussion below regarding a fibrous material). As indicated, the respective liner materials will be selected in light of their properties with respect to the first gas 18 and the fluid 28. The liner material may be a steel (e.g., mild steel, stainless steel, a steel alloy, etc.), copper, a non-ferrous alloy, aluminium, or the like or combinations thereof. In an embodiment, the first wall 20 is made of a composite of steel and reinforced concrete. For example, in the embodiment shown in FIGS. 4 to 9, the first wall 20 comprises a composite of steel and reinforced concrete. With reference to the enlargement shown in FIG. 6, the first wall 20 includes an internal steel liner 30 and an external steel shell 32. A reinforced concrete layer 35 with a web of steel reinforcing 36 is between the internal steel liner 30 and the external steel shell 32. A network of pipes 54 (discussed in more detail below) is formed within the reinforced concrete layer 35 and the cross-section shown in FIG. 6 includes one of the fluid pipes 54. In FIG. 6, the fluid pipe 54 extends within the first wall 20 in a direction which is substantially parallel to the internal surface of the first wall 20 as represented by the surface of the internal steel liner 30. The fluid pipe 54 also extends within the first wall 20 in a direction which is also substantially parallel to the plane in which the first wall 20 extends (vertically as illustrated on the page of FIG. 6). It will be appreciated that the figures are schematic and not to scale and FIG. 6 is intended to illustrate an embodiment. In another embodiment contemplated for the storage of hydrogen gas, the inner side of the reinforced concrete is lined with aluminium and the outer side of the reinforced concrete is lined with steel. In this disclosure, the term "substantially impermeable" has been used to indicate some materials which are generally considered to be impermeable to a particular gas (e.g., the first gas 18) or fluid (e.g., the fluid 28) but which may still have some low level of permeability which does not prevent those materials from being suitable for the storage of the first gas 18 or containment of the fluid 18.

Figure 1A:
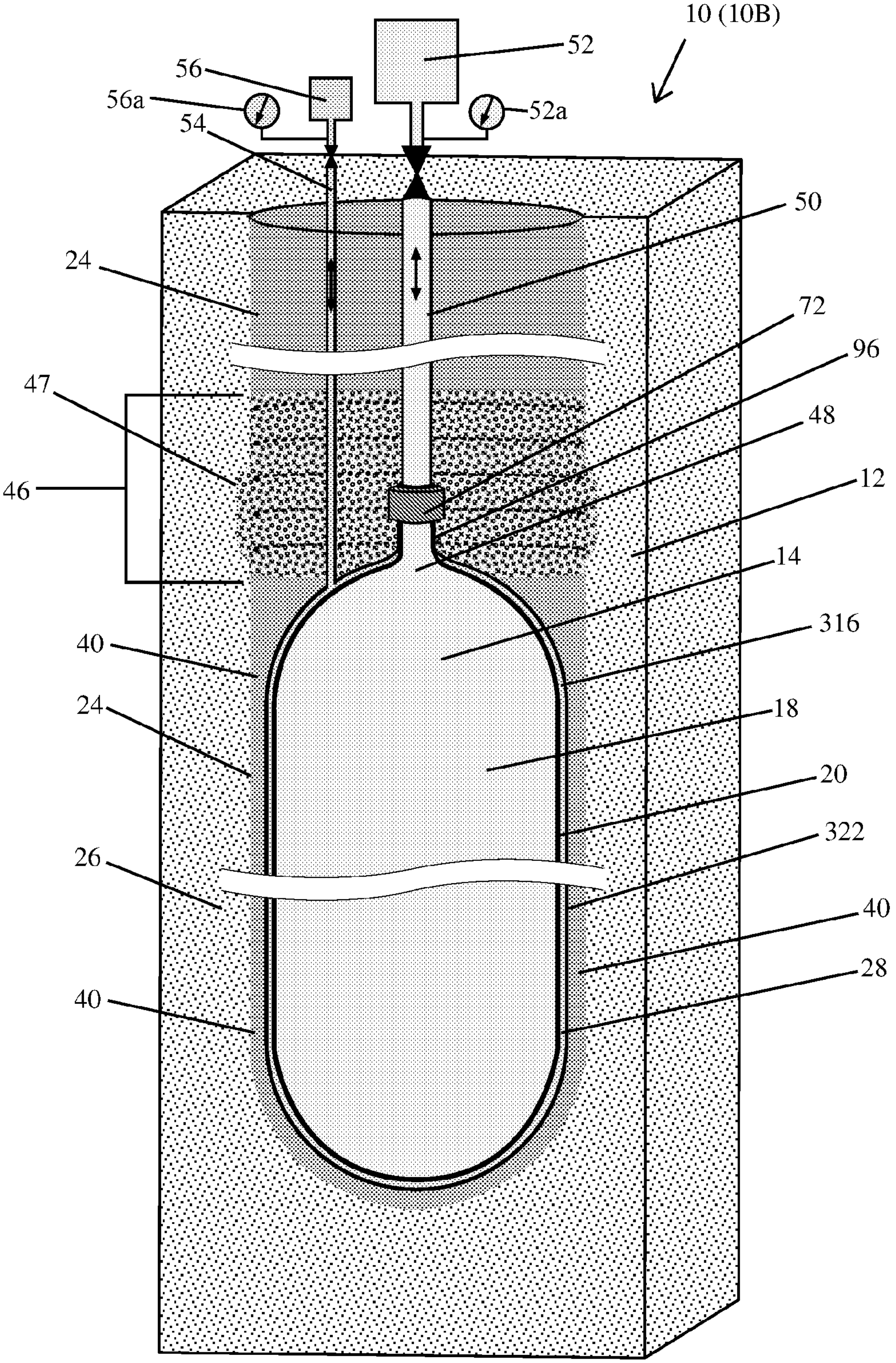
FIG. 1A is a schematic diagram of a storage tank according to an embodiment of the present disclosure.
Figure 1B:
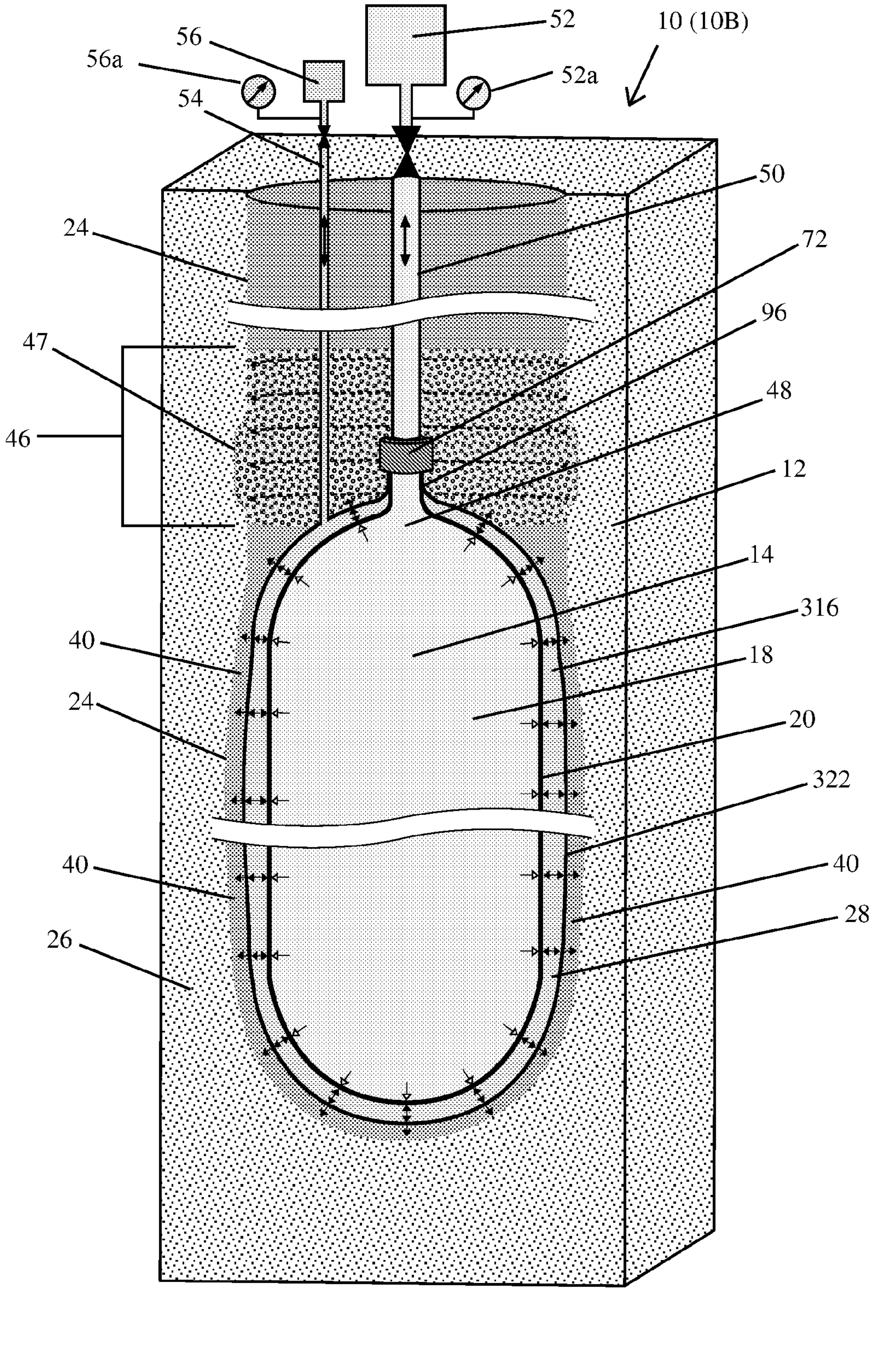
FIG. 1B is a schematic diagram of the storage tank of FIG. 1A illustrating pressures within the storage tank.

The flexible membrane 22 is made from an elastic material which is selected to be impermeable or substantially impermeable to the fluid 28. As explained above, the second chamber 16 is provided between the first wall 20 and the flexible membrane 22. In the embodiments shown in FIGS. 1A and 4, the second chamber 16 is in the form of an annulus which surrounds the first chamber 14. Therefore, in the embodiment illustrated, the second chamber 16 is defined by the first wall 20 on one side and the flexible membrane 22 on the other side. The first wall 20 is also impermeable or substantially impermeable to the fluid 28. Due the flexible nature of the flexible membrane 22, the volume of the second chamber 16 is variable and will change depending on the changes due to deflections in the surrounding structure which may be caused by increasing pressures within the second chamber 16, for example. This change in volume of the second chamber 16 due to the flexible nature of the flexible membrane 22 is illustrated in FIGS. 1A and 1B. FIG. 1B shows that the flexible membrane 22 has expanded outward in some areas relative to its position in FIG. 1A. As a result, the second chamber 16 has increased in size (the physical volume of the second chamber 16 has increased) compared to its size in FIG. 1A. While this change in volume is illustrated with respect to the embodiment shown in FIGS. 1A and 1B, it is also applicable to other embodiments such as those shown in FIGS. 2, 3, and 4.

As can be seen in FIGS. 1A to 4, the first wall 20 is between the first chamber 14 and the second chamber 16. In other words, the first chamber 14 and the second chamber 16 are separated from each other by the first wall 20.

Grout 40 is provided between the flexible membrane 22 and the natural rock structure (the surrounding structure) 26. The grout 40 may be reinforced by fibreglass or other reinforcing material in order to protect the grout 40 and to control, for example, cracking. In the embodiment shown in FIGS. 4 and 6, the grout 40 is reinforced with a mesh 42 of glass fiber reinforced polymer (GFRP). Within the grout 40, the mesh 42 forms a cage around the structural components to the interior of the cage. The grout 40 may be configured to have similar compressive strength comparable to that of the surrounding structure 26. In addition, the grout 40 may include additives to improve its flowability when being poured. The grout 40 may also include additives to improve elasticity and to increase resistance to the penetration by water or other fluids.

In the embodiments shown in FIGS. 1A to 4, a concrete plug 46 is formed above the storage tank 10. The concrete plug 46 is configured to maintain the storage tank 10 in position within the cavity or shaft 24. The concrete plug 46 may be a reinforced concrete plug. In addition, a portion 47 (see FIGS. 1A and 1B) of the shaft 24 above the storage tank 10 may be formed so as to have a wider diameter and the concrete plug 46 may be formed in the wider diameter portion. As a result, at least a part of the concrete plug 46 will have a wider diameter than the shaft 24 above and below the concrete plug 46 and this will help to maintain the storage tank 10 in position and reduce the likelihood that the concrete plug 46 will be moved upward within the shaft 24. In some cases, jet grouting may be used to improve the ground conditions above the storage tank 10 contributing to contain uplift pressures.

The neck 48 of the first chamber 14 of the storage tank 10 is connected via a pipe 50 to a first delivery system 52 which is configured to supply the first gas 18 to the first chamber 14. The first delivery system 52 is also configured to withdraw the first gas 18 from the first chamber 14 through the pipe 50. In that regard, the pipe 50 serves to transfer the first gas 18 into and out of the first chamber 14. The pipe 50, therefore, has the function of transferring the first gas 18 into and out of the first chamber 14. Therefore, the pipe 50 is referred to herein as a "transfer pipe" and it is also referred to herein as "a first gas pipe 50" due to its function of carrying the "first gas" 18. There may be more than one pipe 50 and the first gas 18 may be transferred into the first chamber 14 via one pipe 50 and drawn from the first chamber 14 via another pipe 50.

With reference to the embodiment shown in FIGS. 4 to 9, the second chamber 16 is connected by a plurality of pipes 54 (referred to herein as "fluid pipes 54" due to their function of carrying the fluid 28) to a second delivery system 56 configured to supply the fluid 28 to the second chamber 16. With reference to FIG. 4, the fluid pipes 54 are configured to provide a flow of the fluid 28 into and out of the second chamber 16. In FIG. 4, the flow of the fluid 28 into and out of the fluid pipes 54 is indicated by arrows 58 and 60. It will be appreciated from the description below that the direction of flow of the fluid 28 may be reversed such that the flow of the fluid 28 is opposite to that indicated by arrows 58 and 60 depending on the operation of the storage tank 10 at a particular time. In addition, it will be appreciated from the present disclosure that the fluid pipes 54 and the second delivery system 56 are configured to allow for the circulation of the fluid 28 under pressure into and out of the second chamber 16. The circulation of the fluid 28 into and out of the second chamber 16 may be used to maintain or regulate the temperature within the second chamber 16 and thereby to also maintain or regulate the temperature of other components of the storage tank 10 such as the first wall 20, the first chamber 14, and the first gas 18 stored within the first chamber 14.

Figure 7:
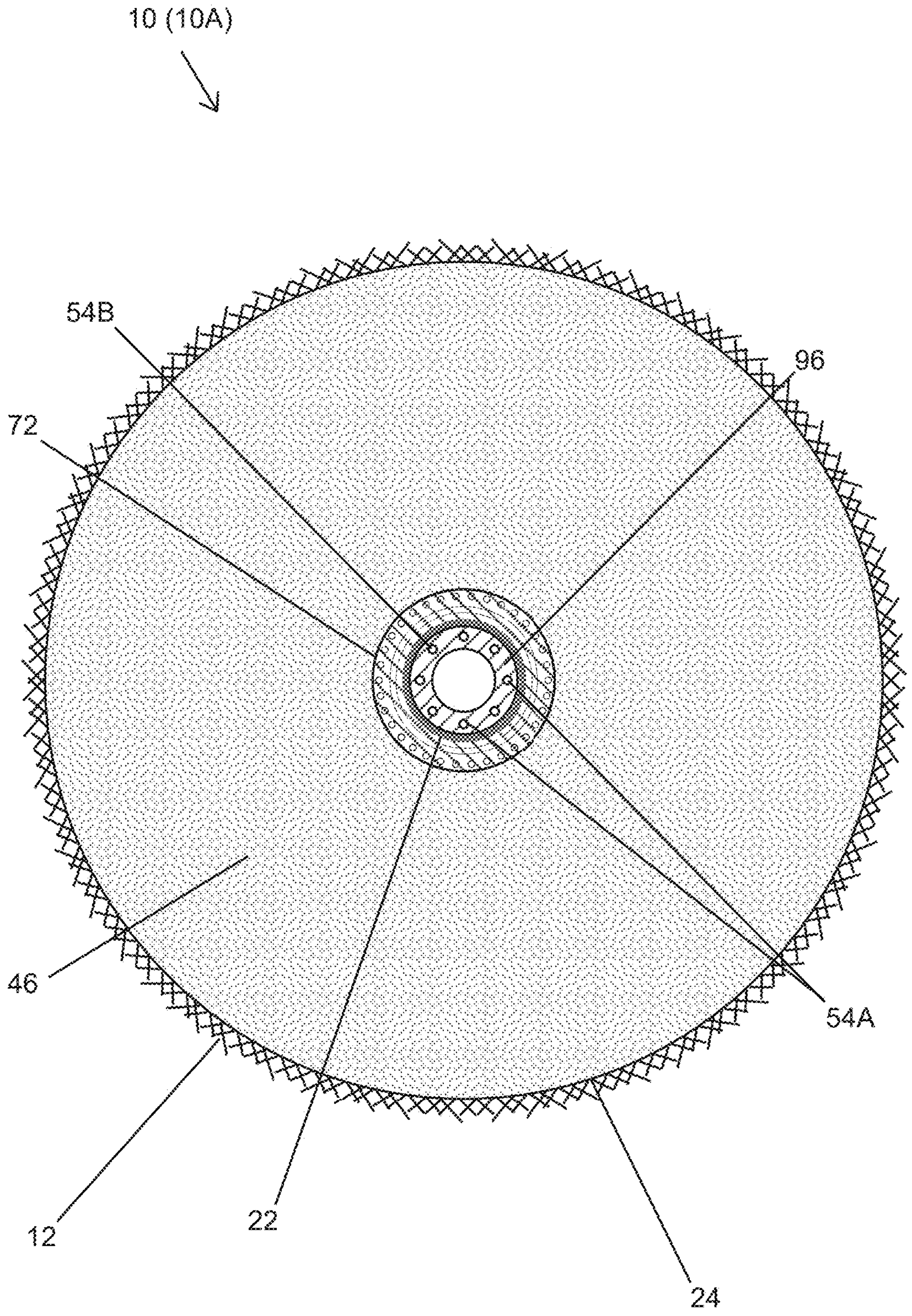
FIG. 7 shows a cross-section along the line VII-VII in FIG. 4.
Figure 8:
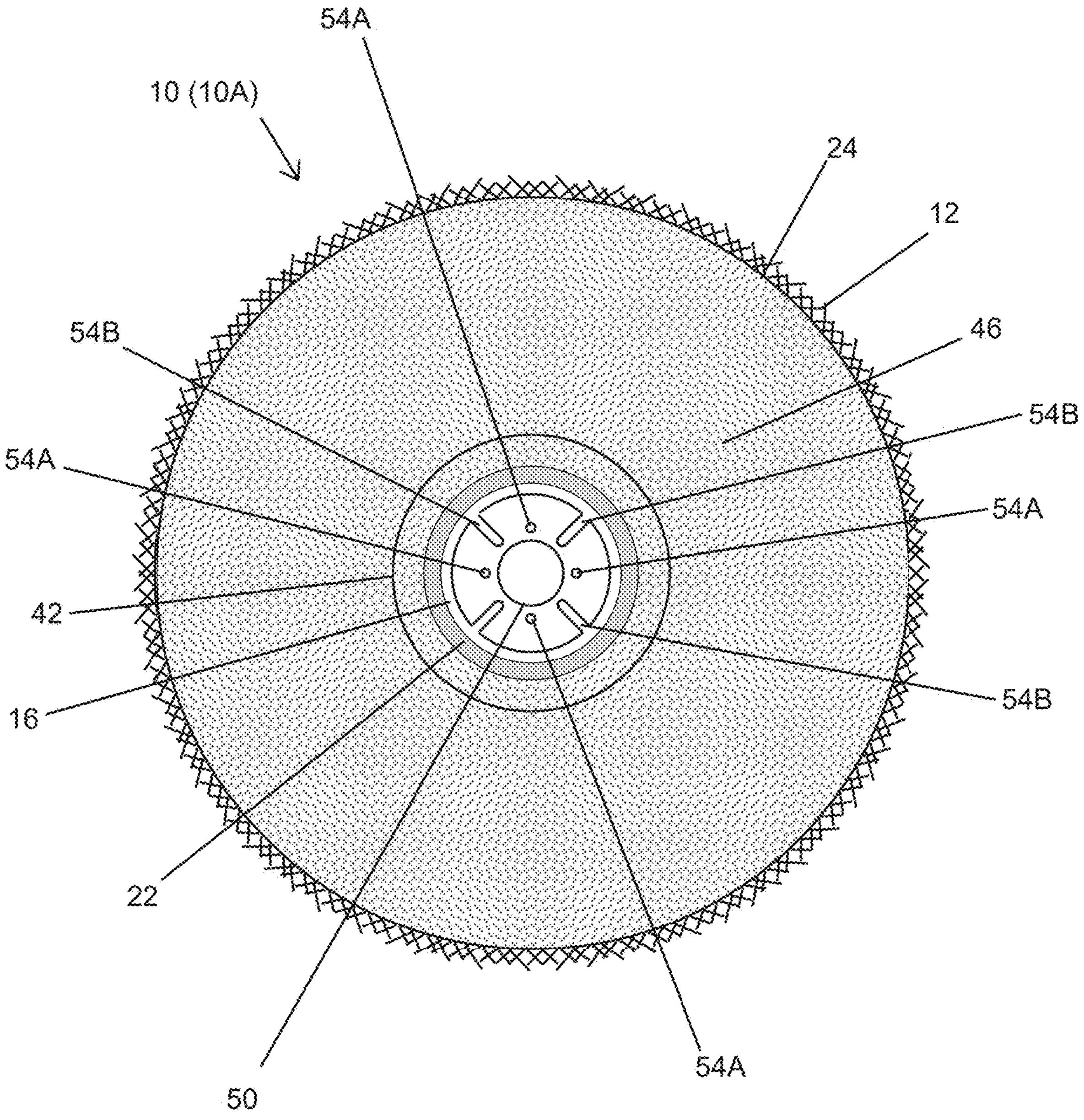
FIG. 8 shows a cross-section along the line VIII-VIII in FIG. 4.
Figure 9:
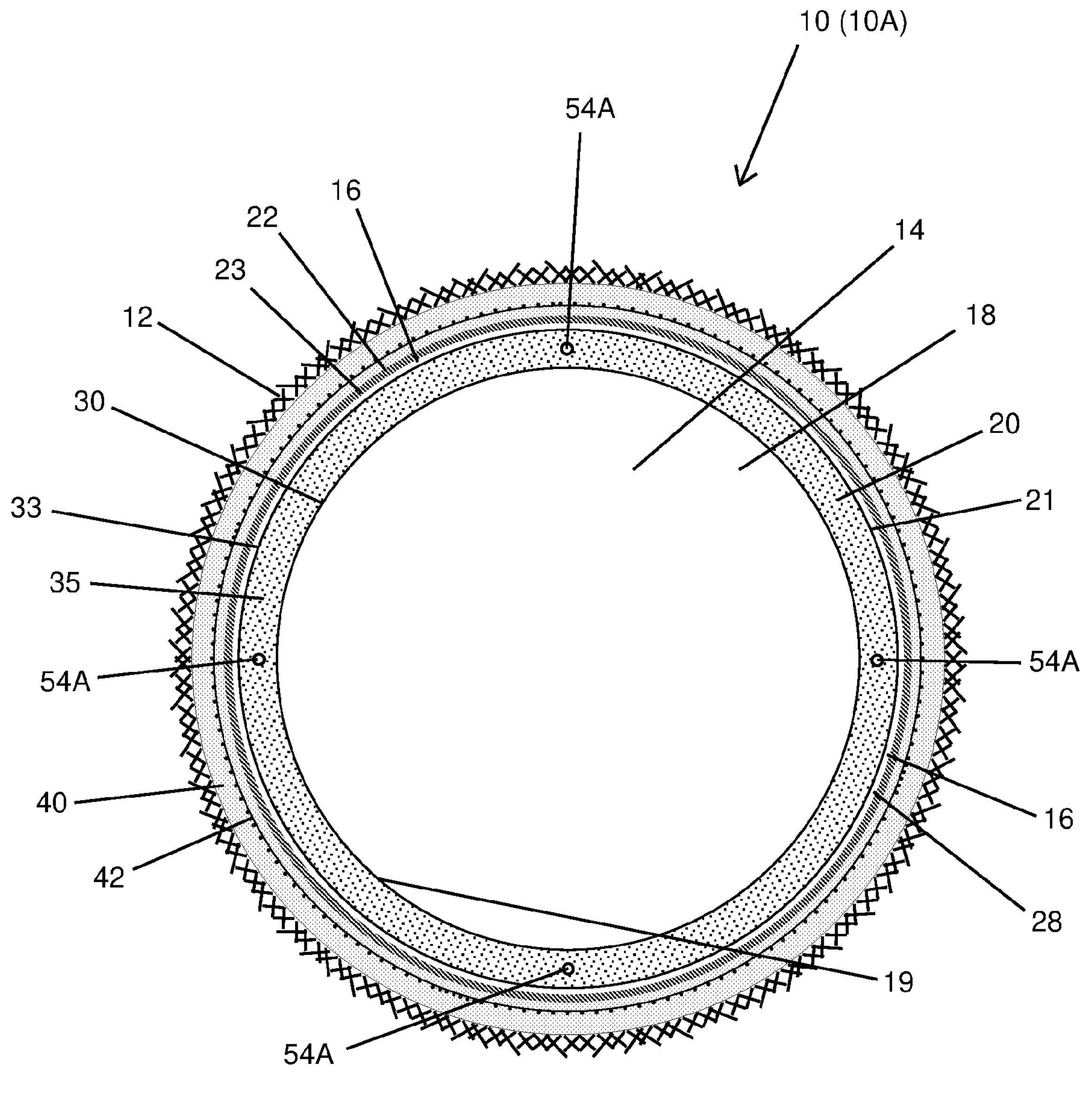
FIG. 9 shows a cross-section along the line IX-IX in FIG. 4.

The fluid pipes 54 include at least one first pipe 54A and at least one second pipe 54B. As illustrated in FIGS. 7 and 8, the fluid pipes 54 include a plurality of the first pipes 54A (referred to herein as "first fluid pipes 54A" in light of their function of carrying the fluid 28) and a plurality of the second pipes 54B (referred to herein as "second fluid pipes 54B" in light of their function of carrying the fluid 28). In FIGS. 5A and 5B, the first fluid pipes 54A and the second fluid pipes 54B are shown connected via first passages 84A and second passages 84B to third fluid pipes 218A and fourth fluid pipe 218B, respectively. The third fluid pipe 218A is shown to the right side of the first gas pipe 50 in the drawing and the fourth fluid pipe 218B is shown to the left side of the first gas pipe 50 in the drawing. The third fluid pipe 218A and the fourth fluid pipe 218B are part of the second delivery system 56. As indicated by arrow 58, in FIG. 4, the third fluid pipe 218A (with the first fluid pipe 54A including the first passage 84A (see FIG. 5)) is functioning as a supply pipe for delivering the fluid 28 to the second chamber 16. The first fluid pipe 54A is embedded in the first wall 20 and the wall of the first extension 96 which is continuous with the first wall 20. In the embodiment shown in FIG. 4, the first fluid pipe 54A is connected to the second chamber 16 toward the bottom 62 of the storage tank 10. As indicated by the arrow 60 in FIG. 4, the fourth fluid pipe 218B (together with the second fluid pipe 54B including the second passage 84B (see FIG. 5)) is functioning as a return pipe for returning the fluid 28 from the second chamber 16 to the second delivery system 56. The second fluid pipe 54B is also embedded in the wall of the first extension 96 but in the vicinity of the transition of the first extension 96 and the first wall 20, the second fluid pipe 54B connects to the second chamber 16. That is, the second fluid pipe 54B is connected to the second chamber 16 at a position vertically higher than the first fluid pipe 54A is connected to the second chamber 16. According to this structure and this functioning of the first fluid pipes 54A and the second fluid pipes 54B, the fluid 28 enters the second chamber 16 toward the bottom 62 of the storage tank 10 and exits the second chamber 16 toward the top 64 of the storage tank 16. In FIG. 4, to assist with an explanation of the path of the first fluid pipe 54A and the second fluid pipe 54B, the first fluid pipe 54A and the second fluid pipe 54B are shown as being on opposite sides of the storage tank 10. In the other Figures (for example, FIGS. 7 and 8), the first fluid pipes 54A and the second fluid pipes 54B are shown at alternating positions around the storage tank 10 and the first fluid pipes 54A are located on opposite sides of the storage tank 10 (and therefore do not correspond directly to the view shown in FIGS. 4, 5A and 5B). For example, in FIG. 8, there are four first fluid pipes 54A and four second fluid pipes 54B.

In the embodiment shown in FIG. 8, the storage tank 10 includes four first fluid pipes 54A and four second fluid pipes 54B. It will be appreciated from the present disclosure that there may be more of these fluid pipes 54 for the circulation of the fluid 28 into and out of the second chamber 16. In FIG. 4, the first fluid pipe 54A is connected to the second chamber 16 toward the bottom of the second chamber 16. However, the first fluid pipe 54A or at least one of a plurality of the first fluid pipes 54A may be connected to the second chamber 16 at the lowest point of the second chamber 16. The first and second fluid pipes 54A 54B may be connected to the second chamber 16 at different positions and at a range of heights.

As explained above, the direction of the flow of the fluid 28 in the first fluid pipes 54A and the second fluid pipes 54B may be reversed depending on the operation of the storage tank 10 at a particular time. For example, when filling the second chamber 16 with the fluid 28, the flow of the fluid 28 into the second chamber 16 may be via the first fluid pipes 54A so that the fluid 28 enters the second chamber 16 at or toward the bottom 62 of the second chamber 16. In this way, due to the action of gravity, the second chamber 16 will fill from the bottom of the second chamber 16 upward and this may facilitate the even distribution of the fluid 28 within the second chamber 16 and facilitate the flow of gases from the second chamber 16, for example, when the fluid 28 is a liquid. In addition, when removing or draining the fluid 28 from the second chamber 16, the direction of flow may be reversed so that the fluid 28 flows down the second chamber 16 to enter the first fluid pipes 54A to be withdrawn from the second chamber 16.

In addition, when regulating the temperature of the fluid 28 within the second chamber 16, the direction of flow may be changed depending on whether a heating operation is being conducted or a cooling operation is being conducted. When a cooling operation is being conducted, the direction of flow may be set so that the fluid 28 enters the second chamber 16 via the first fluid pipes 54A and exits the second chamber 16 via the second fluid pipes 54B. When a heating operation is being conducted, the direction of flow may be reversed so that the cooler fluid is withdrawn from toward the bottom of the second chamber 16 via the first fluid pipes 54A and the warmer fluid 28 enters the second chamber 16 at the top via the second fluid pipes 54B. This may facilitate the flow of the fluid 28 within the second chamber 16 and the overall heating process and reduce the likelihood of pockets of cooler fluid 28 remaining in the second chamber 16. Because of its capacity in the context of the present disclosure to be used to regulate the pressure within the second chamber 16, to regulate temperatures within the storage tank 10, and/or compensate (with the flexible membrane 22) for movement in the surrounding structure, and the like, the fluid 28 may be considered to be a "working fluid".

In the embodiment shown in FIGS. 4 to 9, the storage tank 10 includes at least one first fluid pipe 54A and at least one second fluid pipe 54B. However, the present disclosure is not limited to this arrangement. For example, in the embodiment shown in FIGS. 1A and 1B, only one fluid pipe 54 is provided and the fluid 28 flows into the second chamber 16 and flows out of the second chamber 16 via the same fluid pipe 54. For example, when the second chamber 16 is being filled, the fluid 28 is pumped into the second chamber 16 via the fluid pipe 54. When the second chamber 16 is being emptied, the fluid is drawn out of the second chamber 16 via the fluid pipe 54. Adjustments to the amount and the pressure of fluid 28 within the second chamber 16 can be made by pumping the fluid 28 into the second chamber 16 via the fluid pipe 54 and by releasing fluid 28 from the second chamber 16 via the fluid pipe 54.

When the second chamber 16 is empty, the flexible membrane 22 may be in contact with the outer surface 21 of the first wall 20 (that is, the external surface 33 of the external steel shell 32 in this embodiment). When the second chamber 16 is filled with the fluid 28, the flexible membrane 22 will be pushed away from the first wall 20 by the fluid 28 as the second chamber 16 becomes "inflated" with the fluid 28. The outer surface 21 of the first wall 20 (i.e., the external surface 33 of the external steel shell 32 in this embodiment) and/or the inner surface 23 of the flexible membrane 22 may be textured or coated with a material (not shown), such as a fibrous material, in order to facilitate the separation of the flexible membrane 22 and the first wall 20 and/or to facilitate the even distribution and flow of the fluid 28 within the second chamber 16 so that the fluid 28 is evenly distributed within the second chamber 16 and to reduce the likelihood of the formation of adhesions between the flexible membrane 22 and the first wall 20 which may result in an uneven distribution of the fluid 28 within the second chamber 16. The texturing and/or fibres of the material provide paths for the fluid 28 to travel along between the external steel shell 32 and the flexible membrane 22. In one example, the thickness of textured surface or the fibrous material (not shown) may be 5 mm. In addition, a release agent may be applied to the outer surface 21 of the first wall 20 (the external surface 33 of the external steel shell 32 in this embodiment) to prevent adhesion of the flexible membrane 22. The flexible membrane 22 may be in the form of an inflatable packer.

The outer surface 21 of the first wall 20 (the external surface 33 of the external steel shell 32 in this embodiment) may include a series of annular or circumferential lifting recesses 34 spaced vertically along the length of the storage tank 10 at regular intervals. The upper end of the lifting recess 34A provides a lifting point for casing elevator clamps used to lower and support the storage tank 10 during its construction and installation. The lower end of the lifting recess 34B may also provide support for the membrane 22 at regular intervals, thus relieving the upper portions of membrane 22 from excessive tension imposed by the accumulated weight of the membrane materials suspended below.

The second chamber 16 may include a plurality of smaller chambers (not illustrated). Each smaller chamber may include an isolation mechanism in order for the smaller chamber to be isolated from other smaller chambers. Each smaller chamber may be connected directly to a first fluid pipe 54A and a second fluid pipe 54B for receiving and returning the fluid 28. In this case, when each smaller chamber is connected directly to its own unique pair of first fluid pipe 54A and second fluid pipe 54B which are in turn directly connected to the second delivery system 56, it is possible to control the flow of the fluid 28 to each individual smaller chamber. This configuration provides a mechanism for isolating an individual smaller chamber and thus may facilitate managing a leak in an individual smaller chamber by allowing that smaller chamber to be isolated. In this way, a leak in one smaller chamber may not render the whole system unserviceable.

In addition, the second chamber 16 may be in the form of a tube or hose (not illustrated). The hose or tube may spiral around the first wall 20 or may be arranged vertically, for example, they may be arranged parallel to the vertical axis or longitudinal axis of the storage tank 10. There may be a plurality of such tubes or hoses which spiral around the first wall 20 or are arranged parallel to the vertical axis or longitudinal axis of the storage tank 10. Each tube may be connected at a first end to a first fluid pipe 54A and at a second end to a second fluid pipe 54B in order for the fluid 28 to flow into and out of the tube. This configuration would have the advantages discussed above with respect to the smaller chambers in that each tube could be independently isolated from the other tubes. As will be appreciated from this embodiment, while the second chamber 16 is formed between the first wall 20 and the flexible membrane 22, the provision of other components between the second chamber 16 and the first wall 20 is possible. When the second chamber 16 is in the form of a tube or a hose, the flexible membrane 22 will enclose the second chamber 16 and a portion of the flexible membrane 22 (the wall of the tube or hose) will be between the first wall 20 and the second chamber 16 and between the surrounding structure 12 and the second chamber 16. In this case, the second chamber 16 will be defined by the wall of the tube or the hose.

The second chamber 16 may be formed by a single tube having an internal diameter large enough to fit around the outside of the first wall 20 and the ends of the tube may be sealed at points above and below the first chamber 14. In FIG. 4, the flexible membrane 22 is formed by a tube 17 having an internal diameter large enough to fit around the outside of the first wall 20. The ends 17A and 17B of this tube 17 of flexible membrane 22 are sealed by a clamping device 72 (see below) on a first extension 96 (in the form of a transition manifold 82 (see below)) and by a bottom membrane clamp 90 on a second extension 97 formed at the other end of the storage tank 10 to the first extension 96. By sealing both ends 17A and 17B of the tube 17 in this way, the second chamber 16 is formed between the outer surface 21 of the first wall 20 and the flexible membrane 22.

In a further variation, in another embodiment, a second flexible membrane (not illustrated) may be provided to the outer side of the flexible membrane 22 (a first flexible membrane), for example, between the flexible membrane 22 and the grout 40. In this case, a third chamber (not illustrated) is formed between the flexible membrane 22 and the second flexible membrane and that third chamber is connected independently to the second delivery system or to a third delivery system in order for the supply and withdrawal of a fluid to the third chamber. This third chamber provides a redundancy should the first flexible membrane of the second chamber 16 becomes damaged, deteriorates (for example, due to repeated cycles of pressurisation and depressurisation-see below), or develops a leak (for example, a leak of the fluid 28 through the membrane 22 and into the cavity or shaft 24). When a third chamber is provided, other components and layers may be provided between the second chamber 16 and the third chamber and between the third chamber and the grouting, depending on circumstances. For example, the texturing or fiber material discussed above with respect to the second chamber 16 may be used. In this way, the provision of multiple concentric flexible membranes allows for additional chambers to be formed which, as explained above, provide redundancy in the system. In addition, it will be appreciated from the present disclosure that the third chamber could also be provided between the second chamber 16 and the first wall 20.

By way of non-limiting examples, the flexible membrane 22 may be made from rubber, reinforced rubber, plastic, reinforced plastic, urethane, reinforced urethane, steel, non-ferrous metals or alloys, and the like.

With reference to FIGS. 4 and 5, the embodiment shown includes a first extension 96 in the form of a transition manifold 82. The transition manifold 82 has a plurality of ports 83 located above a clamping device 72 that connect to third and fourth fluid pipes 218A and 218B, respectively (discussed in more detail below). Internal passages 84A and 84B formed within the transmission manifold 82 provide connection to fluid pipes 54A and 54B, respectively, to supply and return a fluid 28 to the second chamber 16.

The transition manifold 82 provides a surface 85 for the clamping device 72 to clamp the flexible membrane 22 against and provide a seal. The surface 85 may include features that contribute to improving the integrity of the seal and mechanical anchor between the flexible membrane 22 and the neck of the transition manifold 82. For example, the surface 85 may include ridges 94 against which the flexible membrane 22 is pressed by the clamping device 72. The internal passages 84A and 84B provide a connection to the second chamber 16 that avoids penetrating the flexible membrane 22 eliminating the risk of leakage which might occur were the passages to pass through the flexible membrane 22.

The transition manifold 82 provides a termination point 86 for the first wall 20 and creates a mouth 48 of the first chamber 14.

In the embodiments shown in the Figures, the storage tank 10 includes a clamping device 72 provided around the transition manifold 82, in the area where the flexible membrane 22 terminates on the transition manifold 82 of the storage tank 10. The clamping device 72 is configured to seal and terminate the second chamber 16 by fixing the flexible membrane 22 to the surface 85 of the transition manifold 82. It will be appreciated from the present disclosure that this clamping device 72 is only an example and other ways of sealing and terminating the second chamber 16 are possible.

In the embodiment shown in FIG. 4, the storage tank 10 includes a second extension 97 at the lower end of the storage tank 10. In this embodiment, the second extension 97 is at the opposite end of the storage tank 10 to the first extension 96. The storage tank 10 includes a second clamping device 90 (a bottom membrane clamp) on the second extension 97. The second clamping mechanism 90 is configured to seal and terminate the second chamber 16 by clamping the second end 17B of the tube 17 of the flexible membrane 22 to the surface 99 of the second extension 97. The second clamping device 90 is configured in a similar way to the clamping device 72.

In the embodiment described above, the storage tank 10 is closely fitted within an excavated cavity 24 created by blind boring a shaft into a natural rock formation 26. It will be appreciated from the present disclosure that the inherent strength of the natural rock walls of the shaft 24 which surround the storage tank 10 will counter the outward pressure exerted by the storage tank 10. However, there is still the potential for such natural rock formations 26 to move when subject to such pressure. This may in part be due to the fact that the process of forming the shaft 24 may in itself cause movement or changes in the natural rock 26 due to the removal of stresses as a result of the drilling process which formed the shaft 24. Subsequent loading of the natural rock formation 26 may lead to movement or deflections in the wall of the shaft 24. Therefore, even where the natural rock formation 26 provides resistance to the pressures exerted by the storage tank 10, there is the potential for movement in the natural rock 26 and for that movement to impact the storage tank 10. Therefore, as explained above, the volume of the second chamber 16 can vary due to the presence of the flexible membrane 22. The volume may be variable by being expandable or contractible. In use, and as explained in more detail below, as the first gas 18 is filled into the first chamber 14, the fluid 28 will be introduced into the second chamber 16 so that the pressure within the second chamber 16 corresponds to the pressure within the first chamber 14. By making the pressure in the second chamber 16 correspond to the pressure in the first chamber 14, strain or stress on the first wall 20 (the composite of steel and concrete in the embodiment of FIGS. 4 and 6) and in particular on the material which lines the internal surface 19 of the first wall 20 which is in contact with the first gas (e.g., hydrogen) 18 may be reduced. In one embodiment, where the correspondence in pressure is such that the pressure in the second chamber 16 is the same as (or substantially the same as) the pressure in the first chamber 14, the pressure on each side of the first wall 20 will be balanced (or substantially balanced) (this is illustrated by the arrows in FIG. 1B and by the gauges 52*a* and 56*a* in FIGS. 1A and 1B) and as a result stresses exerted on the first wall 20 by the pressure in the first chamber 14 can be reduced. In addition, the pressure or forces exerted by the second chamber 16 on the first wall 20 will also be exerted by the second chamber 16 on the surrounding reinforced grout 40 and the surrounding structure 12 (e.g., the natural rock formation 26) (these forces are illustrated by the black arrows in the grout 40 in FIG. 1B). However, as the flexible membrane 22 is flexible and the second chamber 16 has a variable volume, if the surrounding grout 40 and/or the natural rock formation 26 move, the flexible membrane 22 by its nature is also able to move. This movement may result in an increase of the volume within the second chamber 16. An expansion (increase) in the volume of the second chamber 16 is illustrated by FIG. 1A (illustrating the situation prior to expansion of the second chamber 16) and FIG. 1B (illustrating a situation in which the second chamber 16 has increased in size compared to the situation shown in FIG. 1A). However, as the pressure in the second chamber 16 is adjustable to correspond to the pressure within the first chamber 14, the volume of the fluid within the second chamber 16 will be increased so that it provides a corresponding resistance to the pressure in the first chamber 14 and then, with respect to the example given above, the pressures on either side of the first wall 20 will correspond to ensure stress on the first wall 20 and the internal surface 19 is controlled to within allowable limits (see FIG. 1B). In the embodiment of FIG. 1B, the pressure of the fluid 28 is illustrated as a liquid (for example, water or glycol) with black arrows, but as described elsewhere the fluid 28 may be a gas (for example, nitrogen or carbon dioxide). In FIG. 1B, the pressure of the first gas 18 in the first chamber 14 is illustrated with white arrows. In addition, the forces acting on the surrounding rock structure 26 are indicated with black arrows.

As the second chamber 16 is able to expand and contract in size with movement in the surrounding structure 12 such as an expansion or a contraction of the shaft or cavity in the embodiment described above within which the storage tank 10 is arranged, stresses which might otherwise have been experienced by the first wall 20 of the storage tank 10 due to pressures within the first chamber 14 acting on the first wall 20 may be reduced. As a result, the deployment of the storage tank 10 within less stable geological structures than might otherwise be the case may be possible as the storage tank 10 has a facility to compensate for movement of the surrounding structure or changes in the shape of the structure within which the storage tank is positioned which may arise due, for example, to the presence of the storage tank 10 itself and the pressures or forces (illustrated by the outwardly pointing black arrows in the second chamber 16 in FIG. 1B) exerted by the storage tank 10 on the surrounding geological structures 12 (26).

It will be appreciated from the present disclosure that before the second chamber 16 will act to apply pressure to the first wall 20 and to the surrounding structure 12, the second chamber 16 will need to be inflated or filled sufficiently. Thus, when the second chamber 16 is pressurised above a threshold value, the volume of the second chamber 16 will increase and decrease to compensate for movement in the surrounding structure 12.

In an example given above, the pressure in the second chamber 16 and the pressure in the first chamber 14 correspond by being equal or substantially equal. However, there may be situations in which it is desirable for the pressure in the second chamber 16 to be slightly higher than the pressure in the first chamber 14. There may be other situations in which a slightly lower pressure in the second chamber 16 may be desired or required. For example, when the pressure in the second chamber 16 is lower than the pressure in the first chamber 14, if a leak develops in the first wall 20 (for example), the pressure differential will result in the first gas 18 leaking through the first wall 20 into the second chamber 16. In this scenario, a lower pressure in the second chamber 16 compared with the first chamber 14 will decrease the likelihood that the first gas 18 will become contaminated by the fluid 28 if a leak does develop in the first wall 20. As described below, the fluid 28 may be monitored for the presence of the first gas 18 in the fluid 28 as an indication that a leak has occurred.

Therefore, the present disclosure is not intended to be limited to the situation in which the two pressures (the pressure in the first chamber 14 and the pressure in the second chamber 16) are balanced. The correspondence relationship may be determined by the nature of the first gas 18, the nature of the fluid 28, or the combination of the first gas 18 and the fluid 28.

The pressure in the second chamber 16 may be varied according to an algorithm developed for operational purposes such that it may be controlled to be for example any of, a multiple of the pressure in the first chamber 14, a fraction of the pressure in the first chamber 14, with a fixed pressure difference to that of the first chamber 14 or with a constant pressure higher or lower than that of first chamber 14. For example, in operation, a pressure differential between the pressure in the first chamber 14 and the pressure in the second chamber 16 may be controlled to be in the order of 10% or less. In other words, in operation, the pressure in the second chamber 16 may be regulated to be in a range of from 10% higher to 10% lower than the pressure in the first chamber 14. The pressure differential between the pressure in the first chamber 14 and the pressure in the second chamber 16 may be in the range of from 5% higher to 5% lower than the pressure in the first chamber 14. The pressure differential between the pressure in the first chamber 14 and the pressure in the second chamber 16 may be in the range of from 2% higher to 2% lower than the pressure in the first chamber 14. The pressure differential between the pressure in the first chamber 14 and the pressure in the second chamber 16 may be in the range of from 1% higher to 1% lower than the pressure in the first chamber 14. The pressure differential between the pressure in the first chamber 14 and the pressure in the second chamber 16 may be in the range of from 0.5% higher to 0.5% lower than the pressure in the first chamber 14. The pressure differential between the pressure in the first chamber 14 and the pressure in the second chamber 16 may be in the range of from 0.1% higher to 0.1% lower than the pressure in the first chamber 14.

In addition, the pressure in the second chamber 16 may vary from the pressure in the first chamber 14 by a fixed differential. For example, the pressure in the second chamber 16 may be regulated to differ from the pressure in the first chamber 14 by a fixed amount selected from the range of from 0 to 100 kPa more than or less than the pressure in the first chamber 14. For example, the fixed amount may be 10 kPa, 20 kPa, 30 kPa, 40 kPa, 50 kPa, 60 kPa, 70 kPa, 80 kPa, 90 kPa, or 100 kPa. It will be appreciated from the present disclosure that when the differential is 0 kPa, the pressure in the second chamber 16 will be equal to the pressure in the first chamber 14.

By compensating for movement in the natural rock structure 26 caused by fluctuating pressure, it is possible to reduce potential stresses to the first wall 20 and to the internal surface 19 (for example, the internal liner material 30 of the first wall 20) of the first chamber 14 that is in contact with the first gas 18. With the example of hydrogen as the first gas 18 stored in the first chamber 14 and a steel internal liner material 30 on the first wall 20, by reducing the stress on the internal liner material 30 of the first wall 20, the potential for hydrogen attack that could otherwise lead to reduced ductility and early fatigue and failure of the steel liner 30 may be reduced or avoided.

With increasing pressure, the surrounding rock structure 26 may displace as it experiences increasing pressure from the second chamber 16. The flexible membrane 22 is able to follow the displacement in the surrounding rock structure 26 and the variation in volume of the second chamber 16 is compensated for with the fluid 28 to maintain a pressure in the second chamber 16 which is equal to or corresponds (in a predetermined way with) the pressure within the first chamber 14. The flexible membrane 22 is able to compensate for non-uniform rock deflections, jointing and bridging of weak or defective zones. The internal liner of the first wall 20 (for example, the internal steel liner 30) that contains the first gas 18 (for example, hydrogen) does not experience or experiences less strain and stress as there is little or no change in its dimension during the pressure cycle. Thus, the fluid 28 under pressure within the second chamber 16 is able to support and reinforce the first wall 20 and it is able to compensate for displacement in the surrounding rock structure by its action on the flexible membrane 22.

The storage tank 10 stores the first gas 18 under pressure. As can be understood from the above, the primary function of the first chamber 14 of the storage tank 10 is the storage of the first gas 18 and it is configured accordingly. In contrast, the second chamber 16 is configured to support that storage function of the first chamber 14 rather than to store gas or fluid itself. It will be appreciated from the present disclosure, therefore, that the relative volumes of the two chambers when the storage tank is in operation will be different, with the volume of the first chamber 14 being much greater than the volume of the second chamber 16. As indicated above, the figures are schematic and not to scale. However, FIGS. 4, 5, and 6 illustrate to some extent how different those volumes may be. Thus the volume of the second chamber 16 during operation of the storage tank 10 (i.e., when the second chamber 16 is charged with the fluid 28) may be 10% or less than the volume of the first chamber 14, it may be 5% or less than the volume of the first chamber 14. By way of example, with respect to dimensions along the line IX-IX in FIG. 4, the internal diameter of the shaft 24 may be 5.10 meters, the internal diameter (internal width) of the first chamber 14 may be 4 meters, and the external diameter of the first wall 20 may be 4.60 meters (where the thickness of the first wall 20 is 300 mm). Where a textured surface or fibrous material of, for example, 5 mm is provided on the outer surface of the first wall 20, the external diameter of the first wall 20 and that textured surface or fibrous material together may be 4.61 meters. In contrast to the first chamber 14, the internal width of the second chamber 16 (from the inner surface 23 of the flexible membrane 22 to the outer surface 21 of the first wall 20 (when the fibrous material is absent) or to the surface of the fibrous material when present on the first wall 20) may be in the order of 0 to 20 mm or several cm. Therefore, in this example, the volume of the second chamber 16 during operation of the storage tank (i.e., when the second chamber 16 is charged with the fluid 28) may be, for example, from 1 percent to 2 percent of the volume of the first chamber 14. When the textured surface or fibrous material is provided, the textured surface or fibrous material may contribute to the volume of the second chamber 16 due to the presence of interconnected passage ways within the textured surface or fibrous material through which the fluid 18 may circulate. In addition to the dimensions mentioned above, the flexible membrane 22, the grout 40, and the like, will also contribute to occupying the 5.10 meters internal diameter of the shaft 24.

The pressure in the first chamber 14 will vary depending on the nature of the first gas 18 being stored in the first chamber 14. However, for example, the pressure of the first gas 18 when stored in the first chamber 14 may be in the range of from between atmospheric pressure (1 bar) and potentially up to 250 Bar or 25 MPag. In certain applications, higher pressures may be used.

As a result of this arrangement, the first wall 20 may not be as structurally reinforced as would otherwise be the case if the first wall 20 was required to contain the first gas 18 under pressure in the absence of the second chamber 16 and the correspondence between the pressure of the fluid 28 in the second chamber 16 and the pressure of the first gas 18 in the first chamber 14. It will be appreciated from the present disclosure that the first wall 20 can be protected from pressure induced stresses by the presence of the second chamber 16 set against the surrounding structure 12 and charged with a fluid 28 at pressures corresponding to those in the first chamber 14.

In one embodiment, the first chamber 14 stores high pressure hydrogen in a gaseous state (as the first gas 18) and the second chamber 16 is charged with nitrogen (as the fluid 28) at pressures corresponding to the high pressure hydrogen within the first chamber 14 such that stresses on the first wall 20 due to the pressure of the hydrogen in the first chamber 14 are reduced or balanced. The first wall 20 comprises steel and includes an internal steel liner facing the stored hydrogen (the first gas 18). Steel has the advantage of having low permeability to hydrogen. However, as mentioned above, steel under stress is particularly vulnerable to hydrogen attack causing embrittlement which results in reduced ductility and reduced fracture resistance. The above arrangement where the pressures in the second chamber 16 correspond to the pressures in the first chamber 14 to reduce stresses on the first wall 20 allows for the advantageous use of steel with its low permeability to store hydrogen while reducing the difficulties associated with using steel to store hydrogen. Due to its flexible properties and composition, the flexible membrane 22 is likely to have an unacceptably high hydrogen permeability while having a low permeability to fluids, such as nitrogen, glycol, water, and the like, which can be used as the fluid 28 in the second chamber 16. In this embodiment, because the hydrogen (the first gas 18) is contained within the first chamber 14 due to the composition of the first wall 20, the flexible membrane 22 does not need to be impermeable to hydrogen.

As the stored first gas 18 is discharged from the first chamber 14 of the storage tank 10, the pressure on the first wall 20 by the fluid 28 in the second chamber 16 is adjusted by adjusting the amount of fluid 28 within the second chamber 16. At times when there is no increased pressure (for example, the pressure is at atmospheric pressure for the location of the storage tank 10) in the first chamber 14, the flexible membrane 22 may shrink back to rest against the first wall 20. The first wall 20 is configured to withstand compressive forces from the relaxed flexible membrane 22 and any hydrostatic pressure or overburden pressure (from sources surrounding the storage tank 10 which may act on the flexible membrane 22).

FIGS. 1A and 1B shows another embodiment of a storage tank 10 (10B). In this embodiment, the second chamber 316 is formed by a flexible membrane 322. In this embodiment, the flexible membrane 322 is not clamped to an extension at the lower end of the storage tank 10. In this embodiment, the second chamber 316 extends across the bottom below the first chamber 14 and is only clamped to the first extension 96 at the upper end of the storage tank 10.

FIG. 2 shows another embodiment of a storage tank 10 (10C). In this embodiment, the storage tank 10C includes a centraliser assembly 388 mounted on the second extension 97 at the lower end of the storage tank 10C.

As mentioned above, the storage tank 10C includes a bracket in the form of a centraliser assembly 388. The centraliser assembly 388 has four arms 391 which extend outward with each arm 391 terminating in a brace 392. The centraliser assembly 388 assists in positioning the storage tank 10C within the surrounding structure 12, in centring the storage tank 10C within the surrounding structure 12, and/or in maintaining the position of the storage tank 10C within the structure 12.

FIG. 3 shows another embodiment of a storage tank 10D. In this embodiment, the storage tank 10D includes a first centraliser assembly 388 (a bottom centraliser assembly) located at the lower end of the storage tank 10D in a similar way to the embodiment shown in FIG. 2. In addition, the storage tank 10D includes a second centraliser assembly 493 (a top centraliser assembly) located above the clamping mechanism 72. The second centraliser assembly 493 has a similar structure (see above) to the centraliser assembly 388 and functions in a similar way to assist in positioning, centring, and/or stabilising the storage tank 10D within the structure 12.

In FIGS. 2 and 3, the supply of the first gas 18 and the fluid 28 is similar to that shown in FIGS. 1A and 1B. In addition, in FIGS. 2 and 3, the clamping of the flexible membrane 22 at the first extension 96 and the second extension 97 is similar to that shown in FIG. 4. It will be appreciated from the present disclosure that aspects of one embodiment may be applied to other embodiments. For example, the second centraliser assembly 493 (the top centraliser assembly) may be applied to the embodiment illustrated in FIGS. 1A and 1B.

Figure 10:
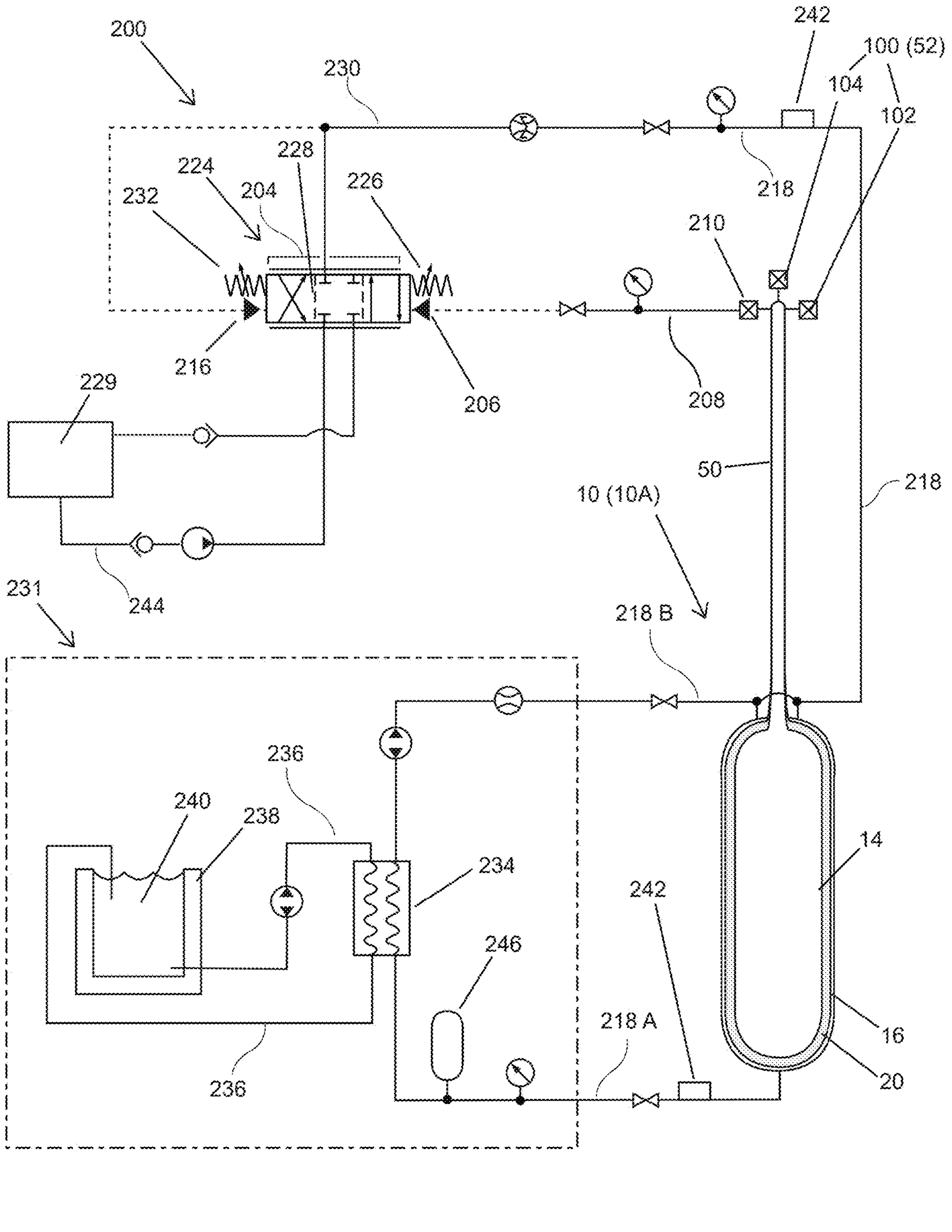
FIG. 10 is a schematic diagram of an embodiment of a gas storage system according to the present disclosure.

With reference to FIG. 10, the storage tank 10 is connected to a first delivery system 100 (not illustrated in detail) for supplying the first gas 18 into the first chamber 14 and for removing the first gas 18 from the first chamber 14. The first delivery system 100 may include regulators for controlling and regulating the pressure of the first gas 18 within the first chamber 14. In addition, the first delivery system 100 may include pumps and valves in order to supply the first gas 18 into the first chamber 14 under pressure and such that the first chamber 14 can be isolated from the first delivery system 100 as required, for example, once the first chamber 14 has been filled and while the first chamber 14 is storing the first gas 18. The first delivery system 100 may supply the first gas 18 directly from a system which generates the first gas 18 and/or it may be configured to supply the first gas 18 from a transportation means by which the first gas 18 has been transported to the location of the storage tank 10. For example, in the case of green hydrogen, hydrogen (as the first gas 18) may be generated in the vicinity of the storage tank 10 by a process which utilises electricity produced by intermittent renewable energy resources (such as wind or solar) and the hydrogen may be pumped via a pipe system to the port 102 of the storage tank 10. When the hydrogen is to be utilized (for example, to produce electricity), it may flow out from the storage tank 10 via the port 102. Further access in the form of port 104 is provided. As an alternative, the first gas 18 may flow out of the storage tank 10 via the port 104. The first delivery system 100 will typically be provided on the surface or at a position above the storage tank 10.

In addition, the storage tank 10 is connected to a second delivery system 200 for supplying the fluid 28 into the second chamber 16 and returning the fluid 28 from the second chamber 16. According to the embodiment described below and illustrated in FIG. 10, the system 200 includes a mechanism for regulating the pressure within the second chamber 16 based on the pressure within the first chamber 14. The system 200 also includes a mechanism for regulating the temperature of the fluid 28 and, thereby, also regulating the temperature in the second chamber 16, and other components within the storage tank 10. By regulating the temperature of the fluid 28, it is also possible to regulate the temperature of the first chamber 14 and also the temperature of the first gas 18 stored within the first chamber 14.

With reference to the embodiment shown in FIG. 10, the second delivery system 200 includes a control valve 224 in the form of a pilot operated three-position proportional directional spool valve. A first end 206 of the spool or control piston 204 is in fluid communication with the first chamber 14 via a third pipe 208 which is connected to a port 210 of the storage tank 10 which is in turn connected to the first gas pipe 50 (the transfer pipe) of the first chamber 14. As a result, the pressure inside the first chamber 14 is able to act upon the first end 206 of the spool 204. In addition, a second end (the end on the opposite side of the control valve 224 is in fluid communication with the second chamber 16 via second pipe 218 which is connected to the fluid pipe 54 of the second chamber 16.

The position and response of the control valve 224 is adjustable by springs 226 which bias the spool 204 to regulate the pressure in the second chamber 16 according to the operational purposes.

As pressure increases inside the first chamber 14 (for example, as the first gas (e.g. hydrogen) 18 is pumped into the first chamber 14 via inlet 102), the spool 204 will be moved toward the second end 216 against the fluid 28 which is acting on the opposing face 228 of the spool 204.

This action introduces more fluid 28 into the second chamber 16 from fluid reservoir 229 via a reservoir pipe 244 and a fluid adjustment pipe 230 which is in fluid communication with the second pipes 218 until the pressure on both sides of the head 214 of the spool 204 is balanced according to the operational purpose and the spool 204 returns to a neutral position. An accumulator 246 is provided on the third fluid pipe 218A. As the first gas 18 is drawn out from the first chamber 14 of the storage tank 10, the pressure in the first chamber 14 falls and the forces acting on the spool 204 cause the spool 204 to move toward the first end 206 of the control valve 224. The spool 204 inside the directional control valve moves accordingly and the control valve 224 is thus actuated to reduce the volume of the fluid 28 in the second chamber 16 until the pressures on either side of the spool 204 is balanced according to the operational purpose and the spool 204 returns to a neutral position. The adjustable springs 226 and 232 are adjusted as required to ensure correct functioning of the control valve 224 and return the spool 204 to a neutral position once pressure balance is achieved.

The system 200 also includes a temperature regulation mechanism 231 for exchanging heat with the fluid 28. In the embodiment shown in FIG. 10, the third fluid pipe 218A passes through a heat exchanger 234. The heat exchanger 234 is connected via heat exchange pipes 236 to an insulated tank 238 in which a heat transfer medium 240 is held. Depending on the direction of flow of the fluid 28 in the third fluid pipe 218A and the direction of flow of the heat exchange medium 240 through the heat exchanger in the heat exchange pipes 236, the fluid 28 may be heated or cooled as required. The system 200 can be configured to have multiple heat exchangers 234 and multiple insulated tanks 238. As a result, heat removed from the fluid 28 during cooling may be stored and used at later time as a source of heat to heat the fluid 28 during a heating operation. In this way, the temperature of the fluid 28 may be regulated and thereby temperatures within the storage tank 10 and the temperature of the first gas 18 may be regulated.

This temperature regulation system 231 allows for thermal management of the storage tank 10 and it can be used to reduce or avoid freeze/thaw cycles that could be detrimental to materials within the system 200 and within the storage tank 10. It may also allow for a greater range of fill and discharge cycles from the storage tank 10.

In this way, the fluid pipes 54A, 54B, 218A, 218B may be used for the supply and return of the fluid 28, the regulation of pressure within the second chamber 16, and the regulation of temperatures within the second chamber 16 and the storage tank 10 via the collection and discharge of thermal energy which may be stored via the heat exchange medium 240 in the insulated tank 238 for reuse on the next or a later cycle.

The system 200 includes sensors or analysers in order to check for contaminants in the fluid 28 and the presence of the first gas 18. For example, in the embodiment shown in FIG. 10, the system includes analysers 242 associated with the third and fourth fluid pipes 218A and 218B. These analysers 242 which detect the presence of trace amounts of the first gas 18 within the fluid 28. This provides a mechanism to monitor the fluid 28 for indications of a leak of the first gas 18 from the first chamber 14 into the second chamber 16.

In the embodiment described above with regard to system 200, a mechanism is described by which the pressure in the second chamber 16 can be regulated to correspond to the pressure in the first chamber. In that embodiment, the correspondence was to make the pressure in both chambers 14 and 16 equal.

Systems by which the pressure in the second chamber 16 is adjusted or regulated to correspond the pressure in the first chamber 14 are not limited to the one described above with reference to FIG. 10. For example, a system (not illustrated) in which the pressure in the first chamber 14 is monitored and measured by sensors and a system of pumps and valves is used to regulate (increase or decrease) the pressure in the second chamber 16 based on the measured pressure is also suitable. In such a situation, the pressure in the second chamber 16 may be regulated to correspond to the pressure in the first chamber 14 by being equal to the pressure in the first chamber 14 or by being higher or lower than the pressure in the first chamber 14 by a predetermined amount. In addition, the correspondence may also be regulated to be different at higher or lower pressures. For example, when the pressure in the first chamber 14 is in a low range, the pressure in the second chamber 16 may correspond by being the same pressure. However, as the pressure rises in the first chamber 14, the pressure in the second chamber 16 may correspond by being 2% higher than the pressure in the first chamber 14. In addition, as the pressure in the first chamber 14 increases to even higher pressures, the correspondence may be adjusted so that the pressure in the second chamber 16 is 4% higher. In other words, the correspondence may be based on a non-linear relationship.

In the embodiment of the system 200 described above, the mechanism for regulating the pressure in the second chamber 16 is linked to the mechanism for regulating the temperature of the fluid 28. The system of the present disclosure is not limited to this example, and the two mechanisms could be provided independently and connected to the second chamber 16 by different pipe arrangements. In addition, as described above, a different pressure regulation system may be used. In that case, the temperature regulation mechanism and the fluid circulation mechanism may be independent of that other pressure regulation mechanism. Furthermore, the system for circulating the fluid 28 into and out of the second chamber 16 may not include a heat exchanger or a separate circulation system without a heat exchanger may be additionally provided.

Figure 11:
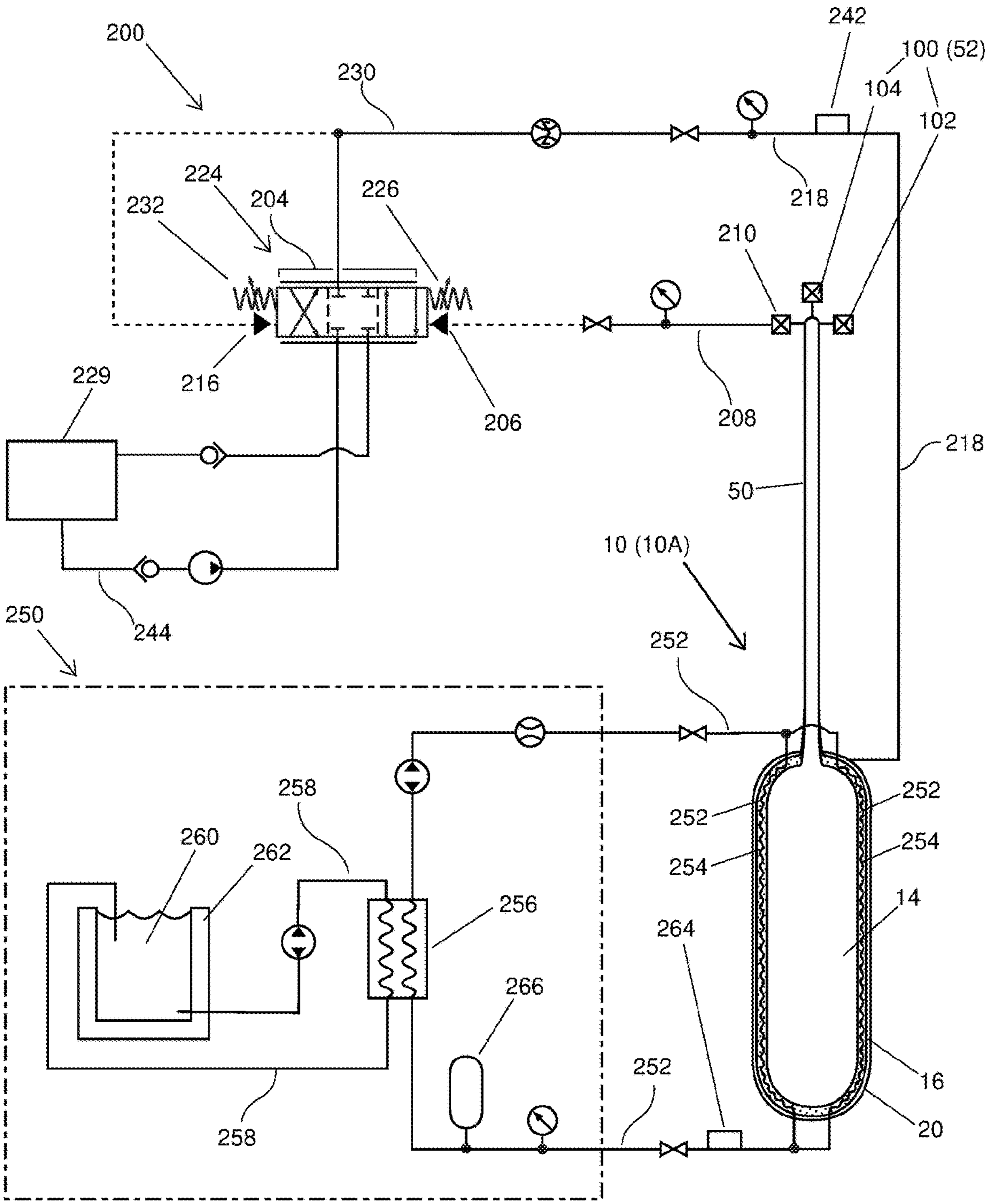
FIG. 11 shows a schematic diagram of another embodiment of a gas storage system according to the present disclosure, the gas storage system having a second circulation system in which an independent network of pipes are imbedded in the first wall.

For example, with reference to FIG. 11, the system 200 may include a second circulation system 250 which is independent of the system for circulating the fluid 28 into and out of the second chamber 16. The second circulation system 250 includes a network of pipes 252 embedded within the first wall 20. A fluid 254 is circulated through the second circulation system 250 in order to regulate the temperature of the first wall 20 (see FIG. 11). By regulating the temperature of the first wall 20, temperatures in the first chamber 14 and the second chamber 16 can also be regulated and the temperature of the first gas 18 and the fluid 28 can also be regulated. It will be appreciated from the present disclosure that, when present, the second circulation system 250 provides an independent system for regulating the temperature within the storage tank 10. It will also be appreciated from the present disclosure that, when the system 200 includes the second circulation system 250 (see FIG. 11), the temperature regulation system 231 (not shown in FIG. 11) may be also be present and the two systems may be operated together to regulate temperatures within the storage tank 10 or the temperature regulation system 231 may be turned off and only the second circulation system 250 be used to regulate temperatures within the storage tank 10. Alternatively, the temperature regulation system 231 may be omitted and temperature regulation with the storage tank 10 may be carried out by means of the second circulation system 250. As with the temperature regulation system 231, the second circulation system 250 may include a heat exchanger 256, heat exchange pipes 258 in which a heat exchange medium 260 is circulated, and a reservoir 262 in which the heat exchange medium 260 is stored. In addition, an accumulator 266 may be present and sensors 264 may be present to detect the presence of the first gas 18 (for example, hydrogen) in the fluid 254 which has circulated through the second circulation system 250 and thereby detect the presence of leaks of the first gas 18 from the first chamber 14.

The diameter of the blind bored shaft 24 and the diameter of the storage tank are not particularly limited but may be selected based on the geological conditions, pre-existing mining structures, or equipment used to form the blind bored shaft. For example, the first chamber 14 of storage tank 10 may have an internal diameter in the range of from 1 meter to 18 meters. The internal diameter of the first chamber 14 may be in the range of from 3 to 15 meters, 5 to 12 meters, 7 to 10 meters, or the like. By way of an example, the blind bored shaft 24 may have a diameter of 5.1 meters. The thickness of the flexible membrane 22 will be selected in light of the gas to be stored in the storage tank 10, the fluid 28, the composition of the surrounding structure 12, and the like. By way of example, the flexible membrane 22 may have a thickness in the range of from 10 mm to 40 mm, from 20 mm to 30 mm, for example, the thickness of the flexible membrane 22 may be 32 mm. The storage tank 10 may have a length for example of from 100 meters to 1000 m or more, for example, the storage tank 10 may have a length of 350 meters. The diameter of the first gas pipe 50 (the transfer pipe for the first gas 18) is not particularly limited and may be, for example, 450 mm. The first gas pipe 50 may extend from the first extension 96 of the storage tank 10 to the surface above ground or to an underground or subterranean facility which may be located some distance from the storage tank 10, for example, it may be at a distance of 40 meters or more away.

Pressure within the second chamber 16 will be adjusted in light of the pressure of the first gas 18 within the first chamber 14. By way of a non-limiting example, the pressure within the second chamber 16 may be in a range of from 0 to 25 MPa.

In the Figures, the orientation of the storage tank 10 is shown as vertical (that is, the longitudinal axis of the storage tank being extends substantially vertically). The orientation of the storage tank 10 is not limited to this arrangement and the storage tank may be arranged in another orientation. For example, the storage tank 10 may be oriented with the longitudinal axis extending horizontally. The storage tank may also be arranged so that the longitudinal axis extends at an angle with respect to the vertical or horizontal planes.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. It will be appreciated embodiments may comprise steps, features and/or integers disclosed herein or indicated in the specification of this application individually or collectively, and any and all combinations of two or more of said steps or features.

The invention claimed is:

1. A storage tank arranged within a surrounding structure, the storage tank comprising:

a first chamber configured to store a first gas under pressure, the first chamber being defined by a first wall, a top, and a bottom and having a substantially fixed volume;

a flexible membrane provided between the first wall and the surrounding structure;

a second chamber between the first wall and the flexible membrane, wherein the second chamber has a variable volume; and at least one transfer pipe which supplies the first gas into the first chamber, wherein the second chamber surrounds the first chamber such that the first wall is between the first chamber and the second chamber and wherein the flexible membrane extends over the top and bottom of the first chamber; and further comprising at least one first pipe in communication with the second chamber and at least one second pipe in communication with the second chamber, wherein a fluid is supplied to the second chamber via the at least one first pipe or the at least one second pipe and the fluid returns from the second chamber via the other of the at least one first pipe and the at least one second pipe.

2. A storage tank according to claim 1, wherein the first gas is hydrogen.

3. A storage tank according to claim 1, wherein a pressure of the fluid in the second chamber is regulated to correspond to a pressure of the first gas in the first chamber.

4. A storage tank according to claim 1, wherein a regulator is associated with the storage tank and a pressure of the fluid in the second chamber is regulated by the regulator to correspond to a pressure of the first gas in the first chamber such that forces acting on the first wall by the first gas in the first chamber are opposed by forces acting on the first wall by the fluid in the second chamber.

5. A storage tank according to claim 1, wherein the first gas is drawable from the first chamber via the at least one transfer pipe.

6. A storage tank according to claim 1, wherein the flexible membrane is formed by a single tube having an internal diameter large enough to fit outside the first wall of the first chamber and the ends of the tube are sealed at points above the top and below the bottom of the first chamber.

7. A storage tank according to claim 1, wherein the surrounding structure is a cavity cut into a natural rock formation.

8. A storage tank according to claim 1, wherein the first wall comprises one or more of a steel, a steel alloy, a non-ferrous alloy, copper, and aluminium.

9. A storage tank according to claim 8, wherein the first wall comprises a reinforced concrete.

10. A storage tank according to claim 9, wherein the first wall comprises an internal steel liner and an external steel shell and a reinforced concrete layer between the internal steel liner and the external steel shell.

11. A storage tank according to claim 1, wherein, when the second chamber is pressurised above a threshold value, the volume of the second chamber will increase and decrease to compensate for movement in the surrounding structure.

12. A storage tank according to claim 1, wherein the second chamber is configured to hold a fluid which is different to the first gas.

13. A storage tank according to claim 1, wherein the first gas is selected from the group consisting of nitrogen, carbon dioxide, natural gas, hydrocarbon gases, and oxygen.

14. A storage tank according to claim 1, wherein the fluid is any one of water, nitrogen, air, carbon dioxide, hydraulic oil, and glycol.

15. A storage tank according to claim 1, wherein the flexible membrane is made from any one of rubber, reinforced rubber, a plastics material, a reinforced plastics material, urethane, a reinforced urethane material, steel, non-ferrous metals, and alloys.

16. A storage system comprising:

a storage tank according to claim 1;

a first delivery system configured to supply the first gas to the first chamber; and a second delivery system configured to supply the fluid to the second chamber.

17. A storage system according to claim 16, further comprising a regulator which regulates a pressure of the fluid in the second chamber to correspond to a pressure of the first gas in the first chamber.

18. A storage system according to claim 16, further comprising a regulator which regulates a pressure of the fluid in the second chamber to correspond to a pressure of the first gas in the first chamber such that forces acting on the first wall by the first gas in the first chamber are opposed by forces acting on the first wall by the fluid in the second chamber.

19. A storage system according to claim 17, wherein the pressure in the second chamber is regulated to be substantially equal to the pressure in the first chamber.

20. A storage system according to claim 16, further comprising a circulation system to circulate the fluid within the second chamber in order to regulate a temperature of the second chamber.

21. A storage system according to claim 16, wherein the storage tank comprises at least one first pipe in communication with the second chamber and at least one second pipe in communication with the second chamber, the fluid is supplied to the second chamber via the at least one first pipe or the at least one second pipe and the fluid returns from the second chamber via the other of the at least one first pipe and the at least one second pipe, and the second delivery system is connected to the at least one first pipe and the at least one second pipe.

22. A storage system according to claim 16, comprising sensors for detecting a presence of the first gas within the fluid.

* * * * *